(12) United States Patent
Yasumoto et al.

(10) Patent No.: US 6,991,870 B2
(45) Date of Patent: Jan. 31, 2006

(54) GAS DIFFUSION ELECTRODE AND FUEL CELL USING THIS

(75) Inventors: Eiichi Yasumoto, Kyoto (JP); Akihiko Yoshida, Hirakata (JP); Makoto Uchida, Hirakata (JP); Junji Morita, Moriguchi (JP); Yasushi Sugawara, Higashiosaka (JP); Hisaaki Gyoten, Shijonawate (JP); Masao Yamamoto, Kishiwada (JP); Osamu Sakai, Neyagawa (JP); Junji Niikura, Hirakata (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 357 days.

(21) Appl. No.: 10/296,338

(22) PCT Filed: Mar. 5, 2002

(86) PCT No.: PCT/JP02/02045

§ 371 (c)(1),
(2), (4) Date: Nov. 21, 2002

(87) PCT Pub. No.: WO02/073721

PCT Pub. Date: Sep. 19, 2002

(65) Prior Publication Data

US 2003/0087145 A1    May 8, 2003

(30) Foreign Application Priority Data

Mar. 8, 2001  (JP) .............................. 2001-064573
Apr. 23, 2001 (JP) .............................. 2001-124370

(51) Int. Cl.
*H01M 4/94*   (2006.01)
*H01M 4/88*   (2006.01)

(52) U.S. Cl. ....................... 429/44; 502/101

(58) Field of Classification Search .................. 429/40, 429/41, 42, 43, 44; 502/101
See application file for complete search history.

(56) References Cited

U.S. PATENT DOCUMENTS 5,607,785 A  *  3/1997  Tozawa et al. ......... 427/1.15 X
5,783,325 A  *  7/1998  Cabasso et al. ............... 429/42
5,935,643 A     8/1999  Song et al.
6,503,655 B1 *  1/2003  Petricevic et al. ............ 429/42

(Continued)

FOREIGN PATENT DOCUMENTS

JP           61-269857 A         11/1986

(Continued)

OTHER PUBLICATIONS

Computer generated translation of JP 9-283,153 (Kamata et al.) Oct. 1997.*

(Continued)

*Primary Examiner*—Stephen J. Kalafut
(74) *Attorney, Agent, or Firm*—Akin Gump Strauss Hauer & Feld, LLP

(57) ABSTRACT

It has been difficult to keep the voltage of a polymer electrolyte fuel cell stable for a long period of time because uniform water content control over the plane of the membrane-electrode assembly is impossible. A gas diffusion electrode is produced by forming a conductive polymer layer composed of conductive particles and a polymer material on a porous material composed of carbon fiber, and forming a catalyst layer composed of platinum-carried carbon particles on the plane of the conductive polymer layer. The conductive polymer layer is composed of conductive particles different in particle size, and the content of the conductive particles having the smaller particle size is decreased from one end towards the other end of the gas diffusion electrode.

10 Claims, 12 Drawing Sheets

U.S. PATENT DOCUMENTS

2003/0082432 A1 * 5/2003 Wilkinson et al. ........ 429/40 X

FOREIGN PATENT DOCUMENTS

| JP | 02-162650 A | 6/1990 |
| --- | --- | --- |
| JP | 07-254419 A | 10/1995 |
| JP | 08-264192 A | 10/1996 |
| JP | 09-283153 A | 10/1997 |
| JP | 2001-057218 A | 2/2001 |

OTHER PUBLICATIONS

Computer generated translation of JP 8-264,192 (Okae) Oct. 1996.*

Computer generated translation of JP 2001-57,218 (Tomosawa et al.) Feb. 2001.*

* cited by examiner

PRIOR ART

PRIOR ART d1>d2

GAS DIFFUSION ELECTRODE AND FUEL CELL USING THIS

CROSS-REFERENCE TO RELATED APPLICATION

This application is a Section 371 of International Application No. PCT/JP02/02045, filed Mar. 5, 2002, the disclosure of which is incorporated herein by reference.

Technical Field

The present invention relates to a fuel cell useful as a consumer cogeneration system and an electric power generator for a mobile such as an automobile, and further to an electrode used in the fuel cell.

BACKGROUND ART

A polymer electrolyte fuel cell makes a supplied fuel gas such as hydrogen and an oxidant gas such as air react electrochemically on a catalyst such as platinum, thereby generating electric power and heat at the same time. In general, the electrode to which a fuel gas is supplied is called the anode electrode, and the electrode to which an oxidant gas is supplied is called the cathode electrode. A diagrammatic cross sectional view showing the structure of a unit cell in such a conventional polymer electrolyte fuel cell is shown in FIG. 1.

In FIG. 1, disposed in intimate contact with both sides of a hydrogen ion conductive polymer electrolyte membrane 11 which selectively transports hydrogen ions are catalyst layers 12 whose main component is carbon powder carrying a platinum-type metal catalyst. Further disposed in intimate contact with the outer surfaces of the catalyst layers 12 are a pair of gas diffusion layers 13 composed of a porous material having pores. The gas diffusion layer 13 and the catalyst layer 12 constitute a gas diffusion electrode 14.

Outsides of the gas diffusion electrodes 14 are disposed separator plates 17 which mechanically fix the electrolyte membrane-electrode assembly 15 (hereinafter referred to also as "MEA") composed of the gas diffusion electrode 14 and the hydrogen ion conductive polymer electrolyte membrane 11, and electrically connect adjacent MEAs in series. The separator plate 17 is provided with a gas flow path 16 at one side for supplying the gas diffusion electrode 13 with a fuel gas as a reaction gas or an oxidant gas, and carrying away the water content produced in the reaction and a surplus gas. This gas flow path 16 can be formed by causing an additional member adhered on the separator plate 17; however, in general, a groove is formed on the surface of the separator plate by a cutting process to form the gas flow path.

In the cathode electrode of the fuel cell in operation, an oxidant gas such as air or oxygen, which is a reaction active material, is diffused into the catalyst layer through the gas flow path via the gas diffusion layer 13. The surplus water produced in the reaction and penetrated from the catalyst layer to the gas diffusion layer is discharged outside the cell through the pores of the gas diffusion layers together with the surplus gas.

The above-described polymer electrolyte fuel cell has the property that the hydrogen ion conductive polymer electrolyte membrane 11 has a higher degree of ion conductivity with increasing moisture content, which makes it necessary to keep the hydrogen ion conductive polymer electrolyte membrane 11 in the humidified condition. For this reason, it is general to humidify the reaction gas in advance to have the predetermined moisture level, thereby securing the moisture retention of the hydrogen ion conductive polymer electrolyte membrane 11 at the same time as the supply of the reaction gas.

The water produced as the result of the electrode reaction is flown from the inlet side to the outlet side of the gas flow path together with the reaction gas flowing through the gas flow path of the separator plate, and is discharged outside the fuel cell in the end. Therefore, the moisture content of the reaction gas in the fuel cell differs depending on the position in the flowing direction of the reaction gas in the gas flow path, which means that the reaction gas on the outlet side contains more moisture content and is more humid than the reaction gas on the inlet side of the gas flow path by the amount of water produced by the reaction.

Therefore, in the vicinity of the outlet side of the gas flow path, the function of discharging water from the gas diffusion layer deteriorates, and in the extreme case, there is a problem that the surplus water blocks the pores of the gas diffusion layer, thereby preventing the diffusability of the reaction gas so as to remarkably decrease the cell voltage (flooding phenomenon). In contrast, there is another problem that when a reaction gas whose humidity has been decreased is supplied from the inlet side in order to prevent the occurrence of flooding in the outlet side, the moisture content of the hydrogen ion conductive polymer electrolyte membrane decreases in the vicinity of the inlet side, which increases the conductive resistance of the hydrogen ions, thereby decreasing the cell voltage. These tendencies become remarkable when the electrode has a larger area and when the separator plate has a longer gas flow path.

In view of the above-described prior art problems, the present invention has an object of providing a gas diffusion electrode capable of keeping the water content homogeneous over the entire MEA surface, and also providing a fuel cell capable of stable operation for a long time of period.

In general, the catalyst layer in a gas diffusion electrode is formed as follows. A catalyst ink is prepared by mixing a dispersion medium such as water or isopropyl alcohol into a solution or a dispersion solution, which contains carbon fine powder carrying a noble metal and a polymer electrolyte having hydrogen ion conductivity. This catalyst ink is applied on a porous material such as carbon paper or carbon cloth, which is to be a base material of the electrode, by using a screen printing method or a spray method, followed by drying or baking to form the catalyst layer. Two gas diffusion electrodes each having the gas diffusion layer and catalyst layer thus prepared are connected to each other via an electrolyte membrane by means of a hot press so as to obtain an electrolyte membrane-electrode assembly (MEA). Besides this method, there is considered a method where a catalyst ink is applied on a polymer film or the like by a gravure printing method or a coater method and dried to form a catalyst layer, and then the catalyst layer is transferred onto an electrolyte membrane.

As described above, it is general to make the catalyst layer used in a fuel cell dense as much as possible so as not to have cavities such as cracks on the plane of the catalyst layer, thereby increasing the utilization of the catalyst. For this reason, a surfactant or the like is added to the catalyst layer ink in order to prevent the agglomeration of the carbon particles and to improve the dispersibility of the carbon particles carrying the catalyst, and the particle size of the carbon particles is minimized as less as possible. For example, there is employed a method where the particle size of the carbon particles is minimized by using a triturating device having a high triturating force such as a planetary ball mill. The occurrence of cracks is prevented by carrying out the drying process of the applied catalyst layer ink moderately at a possibly lowest temperature over a long time.

On the other hand, the smooth proceeding of the electrode reaction in the catalyst layer requires the efficient supply of the reaction gas into the catalyst layer. To achieve this, a method is used where a catalyst layer ink containing a pore-forming agent is applied and baked so as to form a catalyst layer having micro-level pores.

It is effective from the viewpoint of the utilization of the catalyst theelf to make the catalyst layer dense as much as possible by adding a surfactant to the catalyst ink, thereby improving the diffusibility and to decrease the particle size of the carbon particles carrying the catalyst particles. However, such a dense catalyst layer is poor in gas diffusibility, particularly in the direction of thickness. When a polymer electrolyte fuel cell is operated at high current density, a large amount of water, which is a reaction product, generates and resides. This causes the problem of preventing the reaction gas from being diffused into the catalyst layer, making it impossible to obtain sufficient cell performance.

Furthermore, in the case of adding a surfactant, the baking process must be done after the application of the catalyst layer ink, which increases the number of process and makes the producing procedure complicated. Although it is necessary to reduce the particle size of the carbon particles by a planetary ball mill or the like, too small carbon particles make the catalyst layer too dense as described above, thereby deteriorating the cell performance.

It is also possible to improve the gas diffusibility by adding a pore-forming agent to the catalyst layer ink; however, this requires the catalyst layer to be baked after being applied and dried, which is not preferable because the number of the process is increased, and the manufacturing procedure complicated. The case of adding a pore-forming agent has another problem that the catalyst layer becomes thicker.

Drying the applied catalyst layer ink at a possibly lowest possible temperature over a long period of time makes a drying apparatus larger, is not preferable in terms of cost reduction and the simplification of the manufacturing procedure, which is not.

In view of the above situations, a method has been demanded for manufacturing a catalyst layer capable of keeping the gas diffusibility while possibly minimizing a decrease in the catalyst utilization of the catalyst in the catalyst layer.

DISCLOSURE OF INVENTION

The present invention is to solve the problem in the field of a polymer electrolyte fuel cell that a gas diffusion electrode capable of controlling homogeneous water content over the entire surface of an MEA, and a polymer electrolyte fuel cell capable of stable operation over a long period of time.

The present invention relates to a gas diffusion electrode comprising a catalyst layer and a gas diffusion layer containing a porous material, capable of retaining water content homogeneously in the plane.

In the gas diffusion electrode, it is preferable that the area of pores in the gas diffusion layer increases from one end towards the other end of the gas diffusion electrode in the plane of the gas diffusion layer that is on the catalyst layer side.

It is preferable that a polymer material containing conductive particles is included in the pores of the gas diffusion layer, and the amount of the polymer material included in the pores decreases from one end towards the other end of the gas diffusion electrode.

It is preferable that a conductive polymer layer containing at least conductive particles and a polymer material is disposed between the gas diffusion layer and the catalyst layer, and the thickness of the conductive polymer layer decreases from one end towards the other end of the gas diffusion electrode.

It is preferable that a conductive polymer layer containing two kinds of conductive particles different in particle size and a polymer material is disposed between the gas diffusion layer and the catalyst layer, and the content of the conductive particles smaller in particle size decreases from one end towards the other end of the gas diffusion electrode.

The present invention also relates to a method for producing a gas diffusion electrode comprising the steps of:

mixing a carbon material, a polymer material and a solvent to prepare a solution; applying the solution in such a manner that the amount of the solution changes from one end towards the other end of a gas diffusion layer; and heat-processing the gas diffusion layer with the solution applied.

Further, the present invention relates to a method for producing a gas diffusion electrode comprising the steps of: mixing carbon materials different in mean particle size and a solvent to prepare a first solution and a second solution; applying the first solution from one end towards the other end of the gas diffusion layer;

applying the second solution on the gas diffusion layer, on which the first solution has been applied, in such a manner that the amount of the second solution changes from one end towards the other end of the gas diffusion layer; and heat-processing the gas diffusion layer with the solutions applied.

The present invention relates to a polymer electrolyte fuel cell comprising a plurality of unit cells stacked, each unit cell comprising: a hydrogen ion conductive polymer electrolyte membrane; a first gas diffusion electrode and a second diffusion electrode, each comprising a catalyst layer and a gas diffusion layer containing a porous material, which sandwich the hydrogen ion conductive polymer electrolyte membrane in such a manner that the catalyst layer faces said hydrogen ion conductive polymer electrolyte membrane; and a first separator plate having a gas flow path for supplying and distributing an oxidant gas to the first gas diffusion electrode and a second separator plate having a gas flow path for supplying and distributing a fuel gas to the second gas diffusion electrode, wherein the first gas diffusion electrode is composed of the above-mentioned gas diffusion electrode, and the one end of the first gas diffusion electrode is positioned on the inlet side and the other end is positioned on the outlet side of the gas flow path of the first separator.

Further, the present invention relates to a polymer electrolyte fuel cell comprising a plurality of unit cells stacked, each unit cell comprising: a hydrogen ion conductive polymer electrolyte membrane; a first gas diffusion electrode and a second diffusion electrode, each comprising a catalyst layer and a gas diffusion layer containing a porous material, which sandwich the hydrogen ion conductive polymer electrolyte membrane in such a manner that the catalyst layer faces said hydrogen ion conductive polymer electrolyte membrane; and a first separator plate having a gas flow path for supplying and distributing an oxidant gas to the first gas diffusion electrode and a second separator plate having a gas flow path for supplying and distributing a fuel gas to the second gas diffusion electrode, wherein the catalyst layer contains gas diffusing pores for passing the oxidant gas or the fuel gas from the side in contact with the gas diffusion layer towards inside said catalyst layer.

This polymer electrolyte fuel cell can be produced by the method comprising the steps of: applying a catalyst ink containing carbon particles carrying catalyst particles, a hydrogen ion conductive polymer electrolyte and a solvent; and heating and drying the applied catalyst ink up to at least two different temperatures to form a catalyst layer.

The median diameter of the carbon particles is preferably 0.1 to 10 ìm.

BRIEF DESCRIPTION OF DRAWINGS

FIG. 12($b$) is cross-sectional view (without cross-hatching, for clarity) showing the structure of the conventional catalyst layer along the X—X line of FIG. 12$a$.

FIG. 13($b$) is a cross-sectional view (without cross-hatching, for clarity) showing the structure of the catalyst layer along the Y—Y line of FIG. 13($a$), formed according to the present invention.

BEST MODE FOR CARRYING OUT THE INVENTION

The present invention relates to a gas diffusion electrode including a gas diffusion layer containing a porous material and a catalyst layer, thereby securing homogeneous water content in the plane. Therefore, the gas diffusion electrode of the present invention can be modified variously to secure homogeneous water content in the plane.

Embodiment 1

The gas diffusion electrode of Embodiment 1 in accordance with the present invention is characterized in that the electrode has a gas diffusion layer containing a porous material and a catalyst layer formed thereon and that the area of the pores in the plane of the gas diffusion layer increases from one side towards the other side of the gas diffusion electrode. This structure achieves the control of homogeneous water content over the entire plane of the MEA. This is because the amount of water penetrating the gas diffusion layer depends on the area of the pores, and decreases with smaller area and, on the contrary, increases with larger area. Therefore, when an MEA is composed with the gas diffusion electrode of the present invention, the amount of water penetrating in the plane of the MEA can be controlled by controlling the area of the pores.

Figure 1:
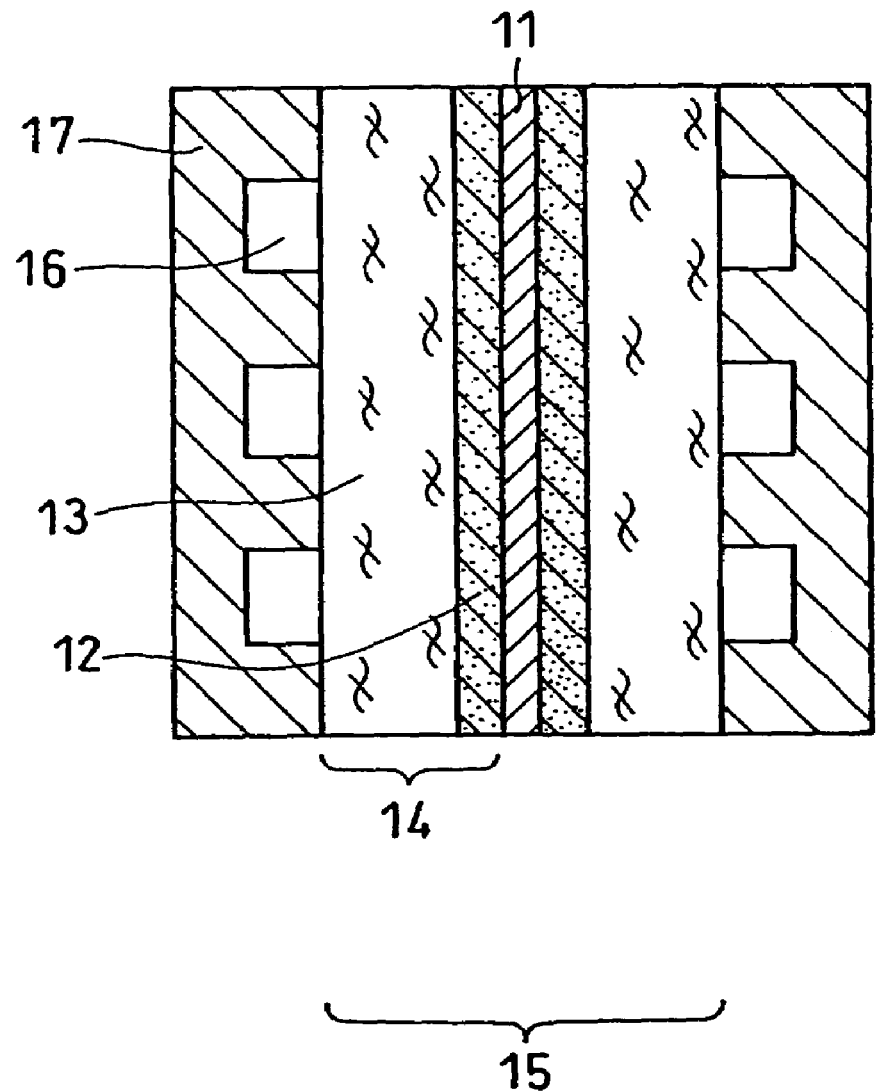
FIG. 1 is a diagrammatic cross sectional view showing the structure of a unit cell of the conventional polymer electrolyte fuel cell.
Figure 2:
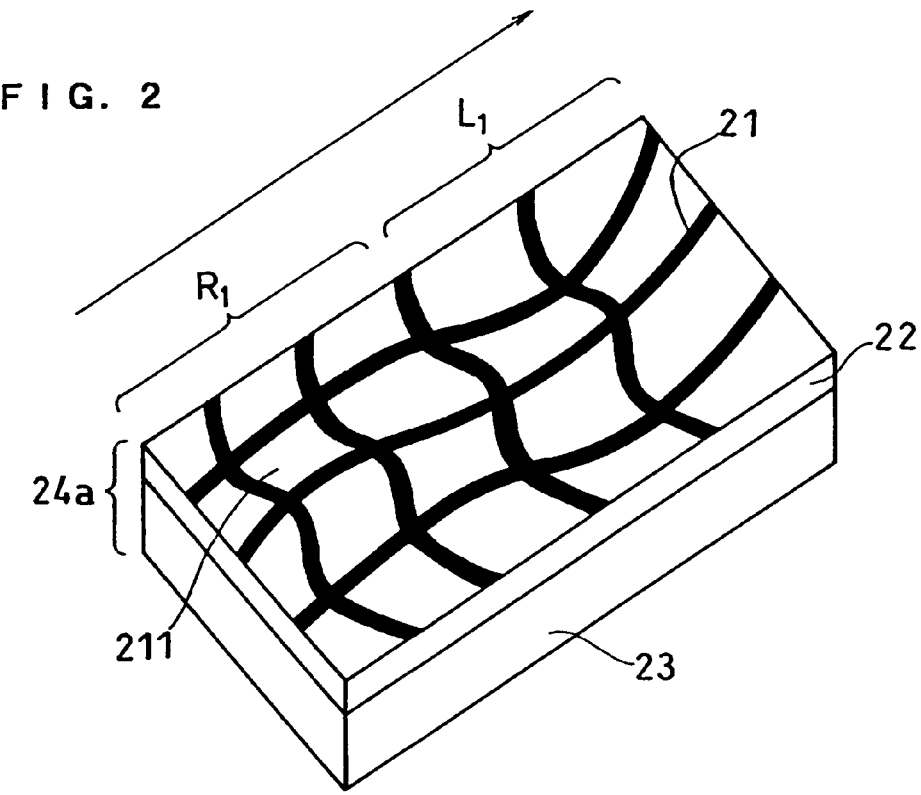
FIG. 2 is a diagrammatic perspective view conceptually showing the gas diffusion electrode of Embodiment 1 of the present invention.

FIG. 2 is a diagrammatic perspective view conceptually showing a gas diffusion electrode 24$a$ in Embodiment 1 of the present invention.

As shown in FIG. 2, the gas diffusion electrode 24$a$ is formed by disposing a catalyst layer 23 comprising carbon particles carrying platinum on one surface of the gas diffusion layer 22 comprising a porous material composed of carbon fiber 21. The carbon fiber 21 forms a pore 211, and as indicated by the arrow in FIG. 2, the area of the pore 211 increases from one end ($R_1$-side end) towards the other end ($L_1$-side end) of the gas diffusion electrode 24$a$.

Figure 3:
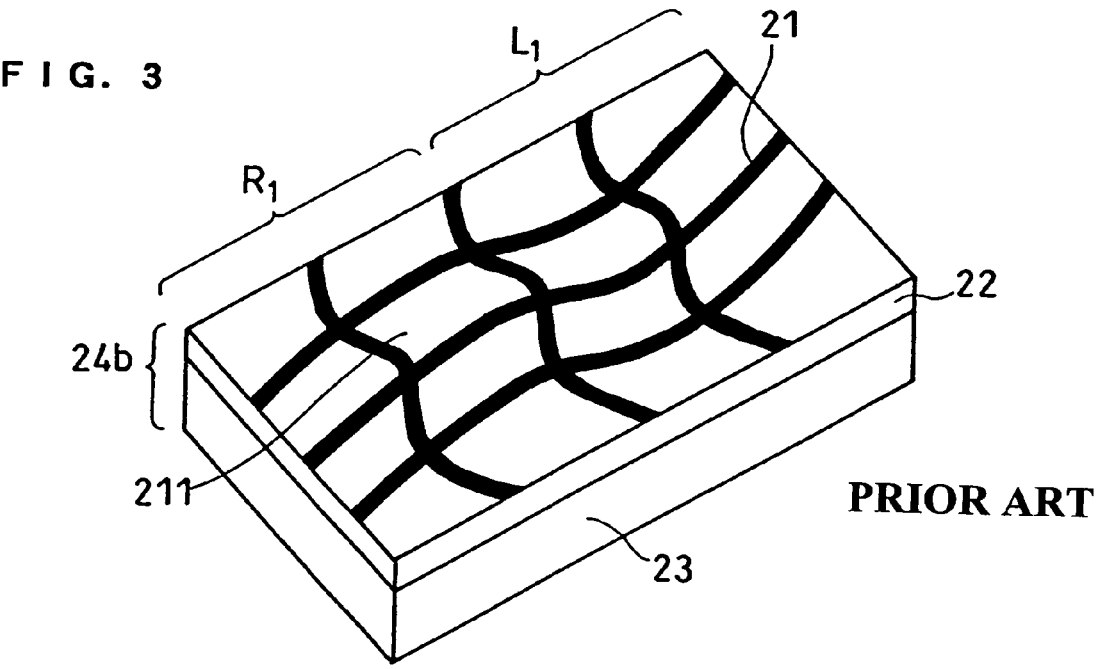
FIG. 3 is a diagrammatic perspective view showing the conventional gas diffusion electrode.

On the other hand, FIG. 3 is a diagrammatic perspective view showing the structure of the conventional gas diffusion electrode 24$b$. Although the gas diffusion electrode 24$b$ has the same fundamental structure as the electrode 24$a$, the $R_1$ side and $L_1$ side have identical construction, and the area of the pore 211 is nearly uniform in the plane of the gas diffusion electrode.

Figure 4:
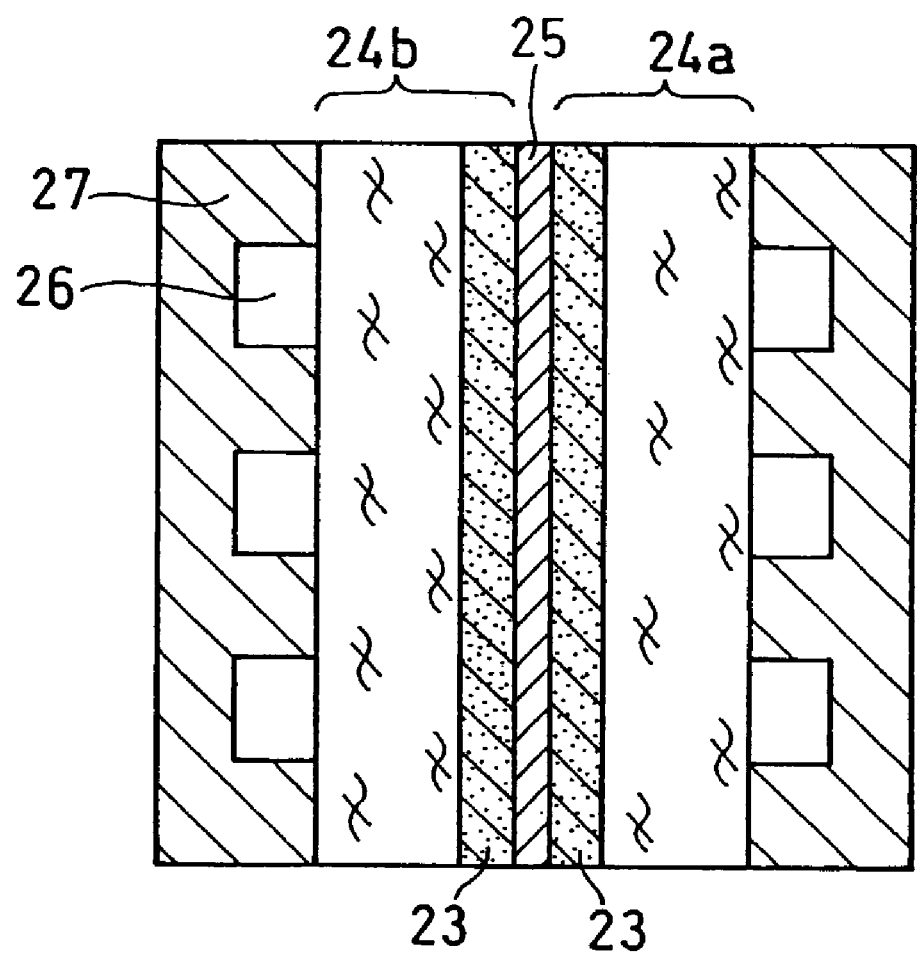
FIG. 4 is a diagrammatic cross sectional view showing the structure of a unit cell of the polymer electrolyte fuel cell manufactured using the gas diffusion electrode shown in FIGS. 2 and 3.

FIG. 4 is a diagrammatic cross sectional view showing the structure of a unit cell of the polymer electrolyte fuel cell manufactured using the gas diffusion electrodes shown in FIGS. 2 and 3. The gas diffusion electrode 24$a$ and the gas diffusion electrode 24$b$ are disposed in intimate contact with the respective sides of a hydrogen ion conductive polymer electrolyte membrane 25 in such a manner that the catalyst layers 23 face the hydrogen ion conductive polymer electrolyte membrane 25.

Furthermore, separator plates 27 having gas flow paths 26 on one side thereof are disposed outside the electrodes, and the gas flow paths 26 carry air as an oxidant gas to the gas diffusion electrode 24$a$ side and hydrogen as a fuel gas to the gas diffusion electrode 24$b$ side.

Assembling a polymer electrolyte fuel cell by using the gas diffusion electrode 24$a$ as the cathode electrode in this manner can achieve a polymer electrolyte fuel cell having a stable voltage over a long period of time. This is because the amount of penetrating water is decreased on the inlet side and is increased on the outlet side of the cathode electrode, which suppresses a decrease in cell voltage resulting from the drying or flooding of the hydrogen ion conductive polymer electrolyte membrane.

Embodiment 2

The gas diffusion electrode of Embodiment 2 in accordance with the present invention includes a gas diffusion layer containing a porous material, a catalyst layer formed on the layer, and a polymer material containing conductive particles included in the pores of the gas diffusion layer, and the content of the polymer material decreases from one end towards the other end of the gas diffusion electrode. Adopting this structure achieves the control of homogeneous water content over the entire plane of the MEA. This is because the area of the pores in the plane of the gas diffusion electrode can be controlled by the amount of the polymer material present in the pores, which enables the control of the amount of penetrating water in the plane of the MEA by the same action as in Embodiment 1.

Figure 5:
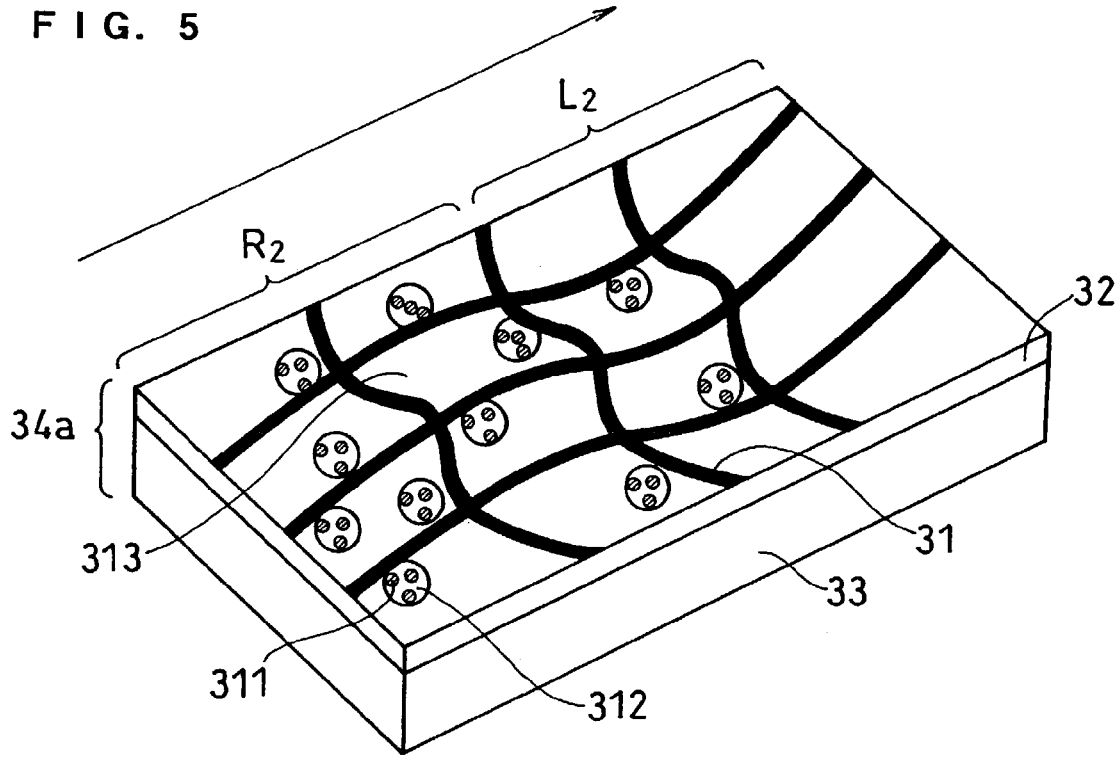
FIG. 5 is a diagrammatic perspective view conceptually showing the gas diffusion electrode of Embodiment 2 of the present invention.

FIG. 5 is a diagrammatic perspective view conceptually showing a gas diffusion electrode 34a in Embodiment 2 of the present invention.

As shown in FIG. 5, the gas diffusion electrode 34a is formed by disposing a catalyst layer 33 composed of carbon particles carrying platinum on a surface of the gas diffusion layer 32 comprising a porous material composed of carbon fiber 31. The carbon fiber 31 forms a uniform pore 313 in the plane of the gas diffusion layer; a mixture of conductive particles 311 and a polymer material 312 is present in the pore; and as indicated by the arrow in FIG. 5, the content of the polymer material 312 decreases from one end ($R_2$-side end) towards the other end ($L_2$-side end) of the gas diffusion electrode 34a.

Figure 6:
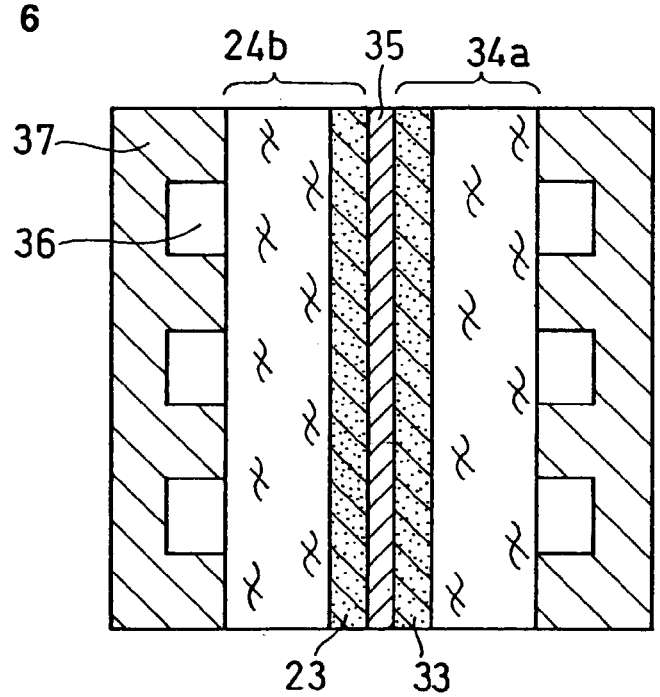
FIG. 6 is a diagrammatic cross sectional view showing the structure of a unit cell of the polymer electrolyte fuel cell manufactured using the gas diffusion electrode shown in FIGS. 3 and 5.

On the other hand, FIG. 6 is a diagrammatic cross sectional view showing the structure of a unit cell of the polymer electrolyte fuel cell produced using the gas diffusion electrode 34a. The gas diffusion electrode 34a and the gas diffusion electrode 24b mentioned in Embodiment 1 are disposed in intimate contact with the respective sides of a hydrogen ion conductive polymer electrolyte membrane 35 in such a manner that the catalyst layers 23 and 33 face the hydrogen ion conductive polymer electrolyte membrane 35.

Furthermore, separator plates 37 having gas flow paths 36 on one side thereof are disposed outside the electrodes and, through the gas flow paths 36, air as an oxidant gas is passed to the gas diffusion electrode 34a side and hydrogen as a fuel gas is passed to the gas diffusion electrode 24b side.

Assembling a polymer electrolyte fuel cell by using the gas diffusion electrode 34a as the cathode electrode in this manner can achieve a polymer electrolyte fuel cell having a stable voltage over a long period of time. The amount of penetrating water is decreased on the inlet side and is increased on the outlet side of the gas flow paths in the cathode electrode. This suppresses a decrease in cell voltage resulting from the drying or flooding of the hydrogen ion conductive polymer electrolyte membrane.

Embodiment 3

The gas diffusion electrode of Embodiment 3 in accordance with the present invention includes a gas diffusion layer having a porous material and a conductive polymer layer which is formed on the porous material and composed of at least of conductive particles and a polymer material, and a catalyst layer formed on the conductive polymer layer. In other words, the gas diffusion electrode of Embodiment 3 in accordance with the present invention includes the gas diffusion layer, the conductive polymer layer, and the catalyst layer. The thickness of the conductive polymer layer decreases from one end towards the other end of the gas diffusion electrode. This structure achieves the control of homogeneous water content over the entire plane of the MEA. This is because the amount of penetrating water depends on the length of the path (penetrating water path) required for the water to penetrate the gas diffusion layer, and decreases as the penetrating water path is longer and increases as the penetrating water path is shorter. In addition, the amount of penetrating water in the plane of the MEA can be easily controlled because the length of the penetrating water path can be changed by the thickness of the gas diffusion layer.

Figure 7:
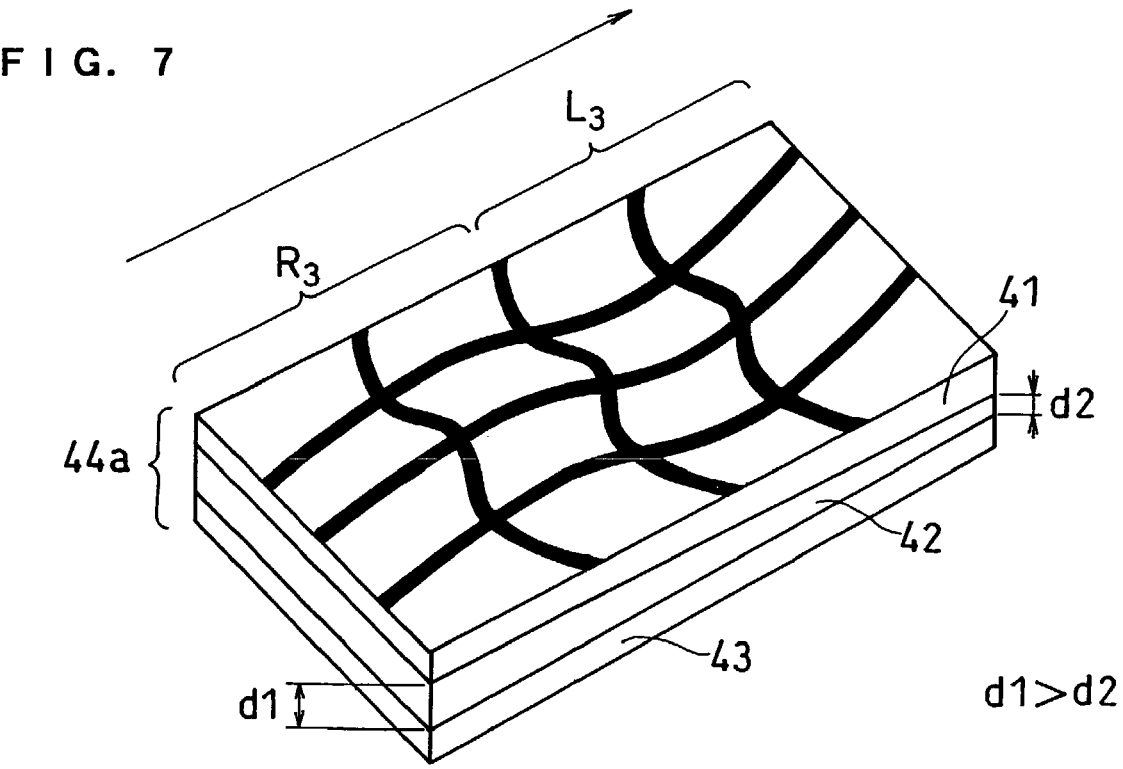
FIG. 7 is a diagrammatic perspective view conceptually showing the gas diffusion electrode of Embodiment 3 of the present invention.

FIG. 7 is a diagrammatic perspective view conceptually showing a gas diffusion electrode 44a in Embodiment 3 in accordance with the present invention.

As shown in FIG. 7, the gas diffusion electrode 44a is constituted by forming a conductive polymer layer 42 composed of conductive particles and a polymer material on a porous material 41 composed of carbon fiber to obtain a gas diffusion layer, and disposing a catalyst layer 43 composed of carbon particles carrying platinum on the surface of the conductive polymer layer 42. As indicated by the arrow in FIG. 7, the thickness of the conductive polymer layer 42 decreases from one end d1 ($R_3$-side end) towards the other end d2 ($L_3$-side end) of the gas diffusion electrode 44.

Figure 8:
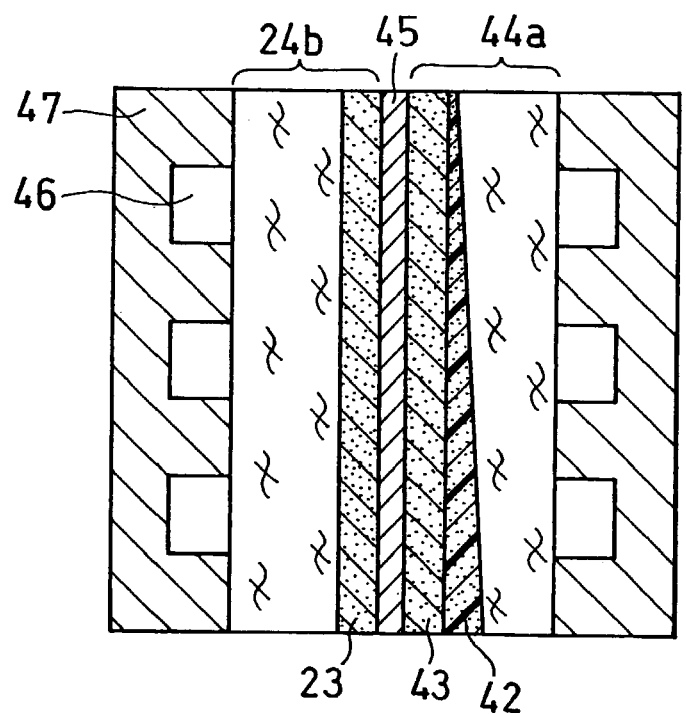
FIG. 8 is a diagrammatic cross sectional view showing the structure of a unit cell of the polymer electrolyte fuel cell manufactured using the gas diffusion electrode shown in FIGS. 3 and 7.

On the other hand, FIG. 8 is a diagrammatic cross sectional view showing the structure of a unit cell of the polymer electrolyte fuel cell produced using the gas diffusion electrode 44a. The gas diffusion electrode 44a and the gas diffusion electrode 24b mentioned in Embodiment 1 are disposed in intimate contact with the respective sides of a hydrogen ion conductive polymer electrolyte membrane 45 in such a manner that the catalyst layers 23 and 43 face the hydrogen ion conductive polymer electrolyte membrane 45.

Furthermore, separator plates 47 having gas flow paths 46 formed on one side thereof are disposed outside the electrodes and, through the gas flow paths 46, air as an oxidant gas is passed to the gas diffusion electrode 44a side and hydrogen as a fuel gas is passed to the gas diffusion electrode 24b side.

Assembling a polymer electrolyte fuel cell by using the gas diffusion electrode 44a as the cathode electrode in this manner can achieve a polymer electrolyte fuel cell having a stable voltage over a long period of time. The amount of penetrating water is decreased on the inlet side and is increased on the outlet side in the cathode electrode. This suppresses a decrease in cell voltage resulting from the drying or flooding of the hydrogen ion conductive polymer electrolyte membrane.

Embodiment 4

The gas diffusion electrode of Embodiment 4 of the present invention includes a gas diffusion layer having a porous material and a conductive polymer layer composed of two kinds of conductive particles different in particle size and a polymer material, and a catalyst layer formed on the gas diffusion layer. In other words, the gas diffusion electrode of Embodiment 4 in accordance with the present invention includes the gas diffusion layer, the conductive polymer layer, and the catalyst layer. Of the conductive particles, the proportion of the smaller conductive particles in the whole conductive particles decreases from one end towards the other end of the gas diffusion electrode 44a. This structure achieves the control of homogeneous water content over the entire plane of the MEA.

In such a gas diffusion layer, cavities formed mainly between conductive particles function as pores, and in the case where conductive particles having different particle sizes are used, the pores are formed in such a manner that the smaller conductive particles fall into cavities formed between the larger conductive particles. Consequently, the area of the pores in the plane of the gas diffusion layer can be varied by changing the relative proportion of the particles, thereby controlling the amount of penetrating water in the plane of the MEA by the same function as described in Embodiment 1.

Figure 9:
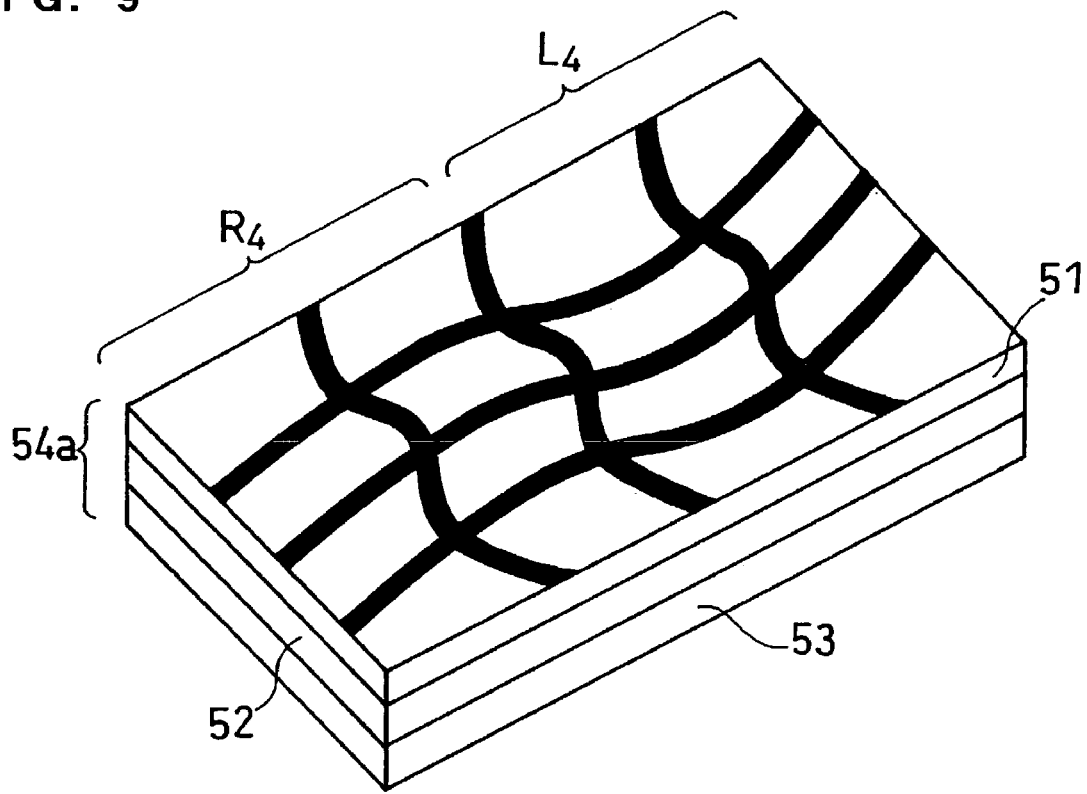
FIG. 9 is a diagrammatic perspective view conceptually showing the gas diffusion electrode of Embodiment 4 of the present invention.
Figure 10:
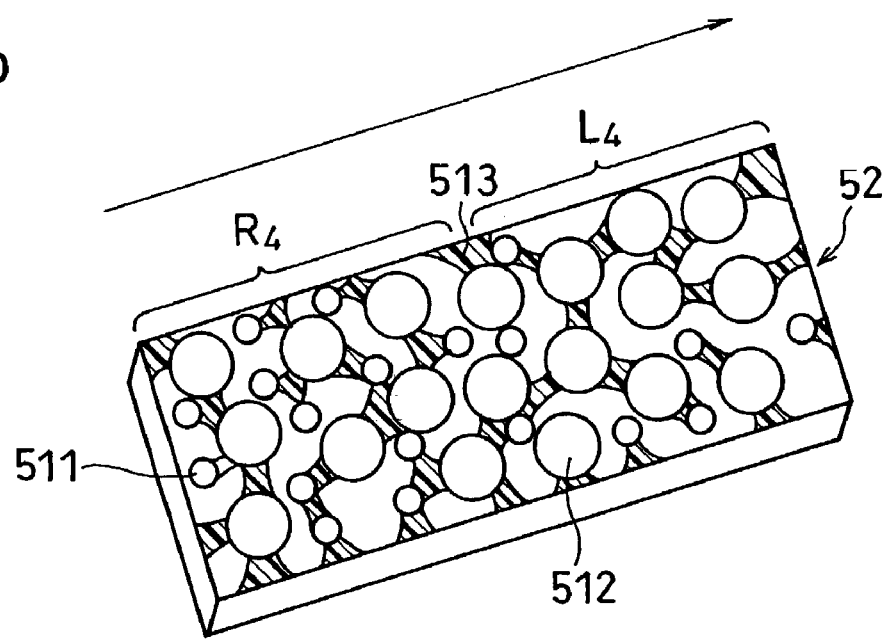
FIG. 10 is a diagrammatic perspective view conceptually showing the conductive polymer layer 52 in FIG. 9.

FIG. 9 is a diagrammatic perspective view conceptually showing the structure of a gas diffusion electrode 54a in Embodiment 4 in accordance with the present invention, and FIG. 10 is a diagrammatic perspective view conceptually showing the structure of a conductive polymer layer 52 in FIG. 9.

As shown in FIG. 9, a gas diffusion electrode 54a is constituted by forming a conductive polymer layer 52 on the surface of a porous material 51 composed of carbon fiber to obtain a gas diffusion layer, and disposing a catalyst layer 53 composed of carbon particles carrying platinum on the surface thereof.

As shown in FIG. 10, the conductive polymer layer 52 includes a mixture of conductive particles 511 and 512 different in particle size, and as indicated by the arrow in FIG. 10, the proportion of the conductive particles 511 of the smaller particle size in the mixture decreases from one end ($R_4$-side end) towards the other end ($L_4$-side end) of the gas diffusion electrode 54.

Figure 11:
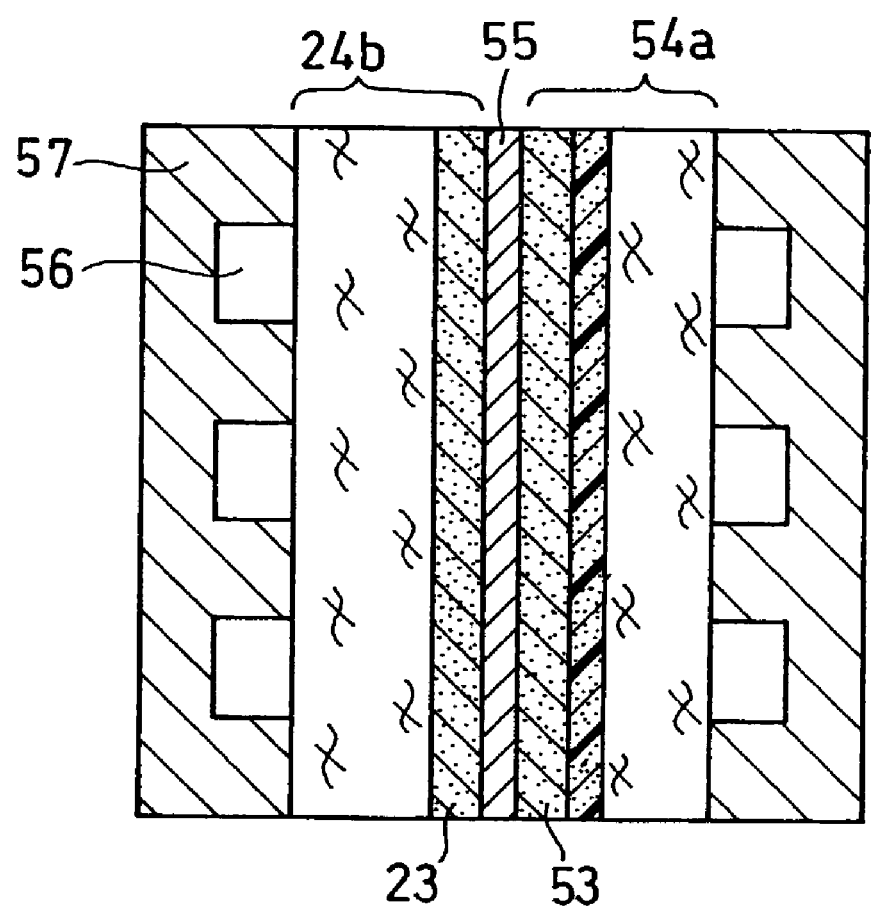
FIG. 11 is a diagrammatic cross sectional view showing the structure of a unit cell of the polymer electrolyte fuel cell manufactured using the gas diffusion electrode shown in FIGS. 3 and 9.

On the other hand, FIG. 11 is a diagrammatic cross sectional view showing the structure of a unit cell of the polymer electrolyte fuel cell produced using the gas diffusion electrode 54a.

The gas diffusion electrode 54a and the gas diffusion electrode 24b explained in Embodiment 1 are disposed in intimate contact with the respective sides of a hydrogen ion conductive polymer electrolyte membrane 55 in such a manner that the catalyst layers 53 and 23 face the hydrogen ion conductive polymer electrolyte membrane 55.

Furthermore, separator plates 57 having gas flow paths 56 formed on one side thereof are disposed outside the electrodes and, through the gas flow paths 56, air as an oxidant gas is passed to the gas diffusion electrode 54a side and hydrogen as a fuel gas is passed to the gas diffusion electrode 24b side.

Assembling a polymer electrolyte fuel cell by using the gas diffusion electrode 54a as the cathode electrode can achieve a polymer electrolyte fuel cell having a stable voltage over long period of time. In the cathode electrode, the amount of penetrating water is suppressed on the inlet side and is facilitated on the outlet side. This suppresses a decrease in cell voltage resulting from the drying or flooding of the hydrogen ion conductive polymer electrolyte membrane.

In the gas diffusion electrodes of Embodiments 2–4, the conductive particles are preferably made of carbon. The reason for this is that this structure enables the provision of a gas diffusion electrode excellent in conductivity. This is because carbon has excellent conductivity.

In the gas diffusion electrodes of Embodiments 1–4, it is preferable to use, as the porous material, carbon paper composed of carbon fiber. The reason for this is that the gas diffusion electrode to be obtained can be excellent in conductivity. This is because carbon has excellent conductivity.

In the gas diffusion electrodes of Embodiments 2–4, the polymer material is preferably fluorocarbon resin. The reason for this is that the use of it can achieve a gas diffusion electrode capable of the stable control of water content over a long period of time. This is because fluorocarbon resin is extremely stable electrochemically.

The gas diffusion electrodes mentioned hereinbefore can be used suitably in a polymer electrolyte fuel cell. Therefore, the present invention also relates to a polymer electrolyte fuel cell comprising a plurality of unit cells stacked, each unit cell comprising: a hydrogen ion conductive polymer electrolyte membrane; a first gas diffusion electrode and a second diffusion electrode, each comprising a catalyst layer and a gas diffusion layer containing a porous material, which sandwich the hydrogen ion conductive polymer electrolyte membrane in such a manner that the catalyst layer faces the hydrogen ion conductive polymer electrolyte membrane; and a first separator plate having a gas flow path for supplying and distributing an oxidant gas to the first gas diffusion electrode and a second separator plate having a gas flow path for supplying and distributing a fuel gas to the second gas diffusion electrode, wherein the first gas diffusion electrode is composed of the gas diffusion electrode in accordance with any one of above Embodiments 1 to 4, and the one end of the first gas diffusion electrode is positioned on the inlet side and the other end is positioned on the outlet side of the gas flow path of the first separator.

Embodiment 5

The present invention also relates to a polymer electrolyte fuel cell comprising a plurality of unit cells stacked, each unit cell comprising: a hydrogen ion conductive polymer electrolyte membrane; a first gas diffusion electrode and a second diffusion electrode, each comprising a catalyst layer and a gas diffusion layer containing a porous material, which sandwich the hydrogen ion conductive polymer electrolyte membrane in such a manner that the catalyst layer faces the hydrogen ion conductive polymer electrolyte membrane; and a first separator plate having a gas flow path for supplying and distributing an oxidant gas to the first gas diffusion electrode and a second separator plate having a gas flow path for supplying and distributing a fuel gas to the second gas diffusion electrode, wherein the catalyst layer contains gas diffusing pores for passing the oxidant gas or the fuel gas from the side in contact with the gas diffusion layer towards inside the catalyst layer.

This fuel cell, which is provided with cavities in the plane of the catalyst layer in order to improve gas diffusion performance, has higher cell performance than the cell using a densely formed catalyst layer. The improved performance becomes remarkable when the cell is operated at high current density.

The inventers of the present invention have found that the utilization of the catalyst does not decrease greatly when the rate of the cavities is made 0.1 to 30%. These cavities can be formed by controlling the drying conditions of the catalyst ink applied on the porous material, without using an additional device.

When the median diameter of the carbon particles carrying catalyst particles is made 0.1 to 10 ìm, the carbon particles do not become too small or too large, making it possible to form a catalyst layer having stable cavities.

The catalyst layer can be formed by the step of applying the catalyst ink containing carbon particles carrying catalyst particles, a hydrogen ion conductive polymer electrolyte, and a solvent; and the step of forming a catalyst layer by heating and drying the applied catalyst ink up to two different temperatures. The use of two-step drying temperatures can generate cavities in the plane of the catalyst layer without adding a pore-forming agent or the like.

Figure 12A:
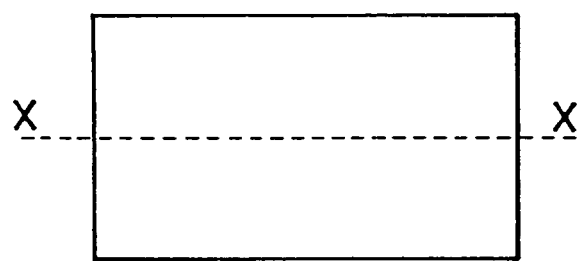
FIG. 12($a$) is a top view showing the structure of the conventional catalyst layer.
Figure 12B:
Figure 13A:
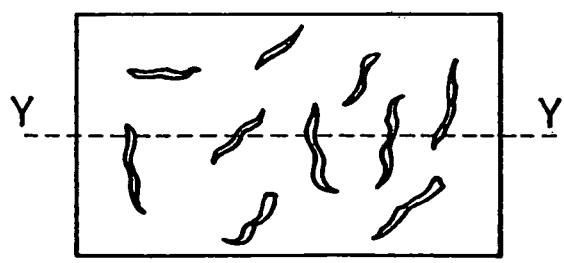
FIG. 13($a$) is a top view showing the structure of the catalyst layer formed according to the present invention.
Figure 13B:
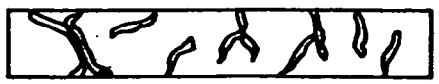

FIG. 13(a) and FIG. 13(b) show the structure of the catalyst layer formed according to the present invention, and FIG. 12(a) and FIG. 12(b) show the structure of the conventional catalyst layer. FIG. 12(a) is a top view of the conventional catalyst layer, and FIG. 12(b) is a cross sectional view taken along the line X—X of FIG. 12(a). It is revealed that the catalyst layer in the conventional case has no cavity in the plane, which indicates that the dense coating film has been obtained.

In contrast, FIG. 13(a) is a top view of the catalyst layer of the present invention, and FIG. 13(b) is a cross sectional view taken along the line Y—Y of (a). It is revealed that the catalyst layer of the present invention has cavities at random in the plane, and the cavities penetrate in the thickness direction of the catalyst layer. As a result, the gas diffusibility in the thickness direction of the catalyst layer improves, as compared with the conventional case. The cavities can be in the form of cracks or circles, besides the shape shown in FIG. 13.

The present invention will be described more specifically using examples as follows; however, the present invention is not limited thereto.

EXAMPLE 1

(1) Production of Gas Diffusion Electrode

In the present example, the gas diffusion electrode of Embodiment 1 shown in FIG. 2 was produced. First, carbon fiber was arranged inside a molding die having a fixed shape in such a manner that the amount changed in the plane, and was molded by applying a pressure uniformly, thereby preparing a porous material "a" whose pore area changed depending on the position in the plane.

The surface of the obtained porous material "a" was observed by an optical microscope to find that the mean pore area was $5.23 \times 10^{-9}$ $m^2$ on one end ($R_1$ side) and $2.08 \times 10^{-8}$ $m^2$ on the other end ($L_1$ side). The thickness was 360 ìm.

The porous material "a" was divided into $R_1$ side and $L_1$ side at the center of the plane, and the amount of penetrating water on each side was evaluated by a gravimetric method (JIS Z0208) to find that the amount was $1.0 \times 10^4$ $g/m^2 \cdot 24$ h on the $R_1$ side and $2.8 \times 10^4$ $g/m^2 \cdot 24$ h on the $L_1$ side. This revealed that the amount of penetrating water decreased on the $R_1$ side and increased on the $L_1$ side.

Next, carbon powder having a particle size of 3 ìm (KETJEN BLACK EC manufactured by AKZO chemie, Holland) was soaked in an aqueous solution of platinum chloride to obtain a catalyst body carrying a platinum catalyst on the surface of the carbon powder through a reduction treatment. In this case, the carbon and the carried platinum were set at a weight ratio of 1:1.

Then, the obtained catalyst was dispersed in an alcohol dispersion of a polymer electrolyte (Flemion manufactured by Asahi Glass Co., Ltd) to prepare a slurry, and the slurry was applied evenly on a side of the porous material "a", which was to be the gas diffusion layer, to form a catalyst layer, thereby obtaining a gas diffusion electrode "a".

On the other hand, a porous material "b" was prepared in the same manner except that the amount of the carbon fiber was made constant in the plane. The mean pore area of the porous material "b" was uniform in the plane, which was $1.08 \times 10^{-8}$ $m^2$, and the thickness thereof was 360 ìm. The amount of penetrating water was $1.8 \times 10^4$ $g/m^2 \cdot 24$ h. In the same manner as the gas diffusion electrode "a", the gas diffusion electrode "b" was obtained from the porous material "b".

(2) Production of Polymer Electrolyte Fuel Cell

The gas diffusion electrode "a" and the gas diffusion electrode "b" of the same size were laid on both sides of a hydrogen ion conductive polymer electrolyte membrane (Nafion 112 manufactured by Du Pont, U.S.A), which is one size larger than these electrodes, in such a manner that the sides provided with the catalyst layers face the hydrogen ion conductive polymer electrolyte membrane. After silicone rubber gaskets with a thickness of 250 ìm were positioned on both sides, hot pressing was applied at 130° C. for 5 minutes to prepare an MEA.

Then, a unit cell was prepared by disposing separator plates on both sides of the MEA, and four unit cells were stacked to obtain a cell stack (the polymer electrolyte fuel cell of the present invention). Used as the separator plate was 4 mm-thick carbon-made plate, which had air-tightness. On the surface in contact with the gas diffusion electrode were formed gas flow path of 2 mm in width and 1 mm in depth by cutting process.

On and under the cell stack were disposed and fixed metal end plates made of SUS304. The gas diffusion electrode "a" was disposed in such a manner that the $R_1$ side was on the inlet side and the $L_1$ side was on the outlet side of the gas flow paths in the separator plates.

Next, air was supplied from the inlet side towards the outlet side of the gas flow paths in the separator plates in the gas diffusion electrode "a", whereas hydrogen was supplied from the inlet side towards the outlet side of the gas flow paths in the separator plates in the gas diffusion electrode "b", and the fuel cell was operated under the conditions that the utilization of oxygen was 40%; the utilization of hydrogen was 70%; hydrogen humidifying bubbler temperature was 85° C.; air humidifying bubbler temperature was 65° C.; and cell temperature was 75° C.

As a result, the polymer electrolyte fuel cell operated in a quite stable manner, while maintaining the initial voltage as long as over 3000 hours. The reason for this is that the polymer electrolyte fuel cell of the present example was able to discharge excess water content caused by the produced water safely and quickly, while keeping the polymer electrolyte in the humidified condition.

The pore area is not limited to the one described in the example; the polymer electrolyte fuel cell was able to operate stably as long as the area was larger in the $L_1$ side than in the $R_1$ side.

EXAMPLE 2

(1) Production of Gas Diffusion Electrode

In the present example, the gas diffusion electrode of Embodiment 2 shown in FIG. 5 was produced. First, 10 g of acetylene black, 2 g of fluorocarbon resin (D-1 manufactured by Daikin Industries, Ltd.), and 50 g of ethanol were mixed and stirred to prepare a dispersion "a" where acetylene black was dispersed in the fluorocarbon resin.

Then, screen printing was applied in such a manner that the amount of the dispersion "a" differed from one end towards the other end of the porous material "b" used in Example 1. The amount of the dispersion "a" was adjusted by changing the pushing pressure of the squeegee during the printing from one end towards the other end of the porous material "b". This printing made the dispersion "a" impregnated into the porous material "b".

The porous material "b" impregnated with the dispersion "a" was baked at 350° C. to obtain a gas diffusion layer "c". The surface of the gas diffusion layer "c" was observed by an optical microscope to find that fluorocarbon resin was retained in the pores, and the acetylene black was dispersed and retained in the fluorocarbon resin. It was also observed that the amount of acetylene black and fluorocarbon resin increased from one end ($R_2$ side) towards the other end ($L_2$ side) of the gas diffusion layer.

The obtained gas diffusion layer "c" was divided into $R_2$ side and $L_2$ side, and the amount of penetrating water on each side was evaluated to find that the amount was $0.8 \times 10^4$ g/m$^2 \cdot$24 h on the $R_2$ side and $1.8 \times 10^4$ g/m$^2 \cdot$24 h on the $L_2$ side. This revealed that the amount of penetrating water decreased on the $R_2$ side and increased on the $L_2$ side.

Next, carbon powder having a particle size not larger than 3 ìm (KETJEN BLACK EC manufactured by AKZO chemie, Holland) was soaked in an aqueous solution of platinum chloride to obtain a catalyst body carrying a platinum catalyst on the surface of the carbon powder through a reduction treatment. In this case, the carbon and the carried platinum were set at a ratio of 1:1 in weight.

Then, the obtained catalyst was dispersed in an alcohol dispersion of a polymer electrolyte (Flemion manufactured by Asahi Glass Co., Ltd) to prepare a slurry, and the slurry was applied evenly on a side of the gas diffusion layer "c" to form a catalyst layer, thereby obtaining a gas diffusion electrode "c".

(2) Production of Polymer Electrolyte Fuel Cell

The gas diffusion electrode "c" and the gas diffusion electrode "b" of the same size were laid on both sides of a hydrogen ion conductive polymer electrolyte membrane (Nafion 112 manufactured by Du Pont, U.S.A), which is one size larger than these electrodes, in such a manner that the sides provided with the catalyst layer face the hydrogen ion conductive polymer electrolyte membrane. After silicone rubber gaskets with a thickness of 250 ìm were positioned on both sides, hot pressing was applied at 130° C. for 5 minutes to prepare an MEA.

Then, a unit cell was prepared by disposing separator plates on both sides of the MEA, and four unit cells were stacked to obtain a cell stack (the polymer electrolyte fuel cell of the present invention). Used as the separator plate was 4 mm-thick carbon-made plate, which had air-tightness. On the surface in contact with the gas diffusion electrode were formed gas flow path of 2 mm in width and 1 mm in depth by cutting process.

On and under the cell stack were disposed and fixed metal end plates made of SUS304. The gas diffusion electrode "c" was disposed in such a manner that the $R_2$ side was on the inlet side and the $L_2$ side was on the outlet side of the gas flow paths in the separator plates.

Next, air was supplied from the inlet side towards the outlet side of the gas flow paths in the separator plates in the gas diffusion electrode "c", whereas hydrogen was supplied from the inlet side towards the outlet side of the gas flow paths in the separator plates in the gas diffusion electrode "b", and the fuel cell was operated under the conditions that the utilization of oxygen was 40%; the utilization of hydrogen was 70%; hydrogen humidifying bubbler temperature was 85° C.; air humidifying bubbler temperature was 65° C.; and cell temperature was 75° C.

As a result, the polymer electrolyte fuel cell operated in a quite stable manner, while maintaining the initial voltage as long as over 3000 hours. The reason for this is that the polymer electrolyte fuel cell of the present example was able to discharge excess water content caused by the produced water safely and quickly, while keeping the polymer electrolyte in the humidified condition.

EXAMPLE 3

(1) Production of Gas Diffusion Electrode

In the present example, the gas diffusion electrode of Embodiment 3 shown in FIG. 7 was produced. First, 10 g of acetylene black (DENKA BLACK manufacture by Denki Kagaku Kogyo K.K.) and 2 g (as solid matter) of fluorocarbon resin (D-1 manufactured by Daikin Industries, Ltd.) were mixed and stirred to prepare a dispersion "b" where acetylene black was diffused in the fluorocarbon resin.

Then, screen printing was applied in such a manner that the applied amount of the dispersion "b" differed from one end towards the other end of the porous material "b" used in Example 1. The dispersion "b" did not penetrate into the porous material "b" completely and remained on the upper region as a coating film.

Later, the applied porous material "b" was baked at 350° C. to obtain a gas diffusion layer "d". The surface of the gas diffusion layer "d" was observed by an optical microscope to find that a layer containing acetylene black and fluorocarbon resin was formed on the porous material "b", and the thickness of the layer was measured by a surface profiler to find that the layer became thinner from one end ($R_3$ side) towards the other end ($L_3$ side)of the gas diffusion layer "d" (d1 to d2).

The obtained gas diffusion layer "d" was divided into $R_3$ side and $L_3$ side, and the amount of penetrating water on each side was evaluated. The amount was $0.8 \times 10^4$ g/m$^2 \cdot$24 h on the $R_3$ side and $1.8 \times 10^4$ g/m$^2 \cdot$24 h on the $L_3$ side. This revealed that the amount of penetrating water decreased on the $R_3$ side and increased on the $L_3$ side.

Next, carbon powder having a particle size not karger than 3 ìm (KETJEN BLACK EC manufactured by AKZO chemie, Holland) was soaked in an aqueous solution of platinum chloride to obtain a catalyst body carrying a platinum catalyst on the surface of the carbon powder through a reduction treatment. In this case, the carbon and the carried platinum were set at a ratio of 1:1 in weight.

Then, the obtained catalyst was dispersed in an alcohol dispersion of a polymer electrolyte (Flemion manufactured by Asahi Glass Co., Ltd) to prepare a slurry, and the slurry was applied evenly on a side of the gas diffusion layer "d" to form a catalyst layer, thereby obtaining a gas diffusion electrode "d".

(2) Production of Polymer Electrolyte Fuel Cell

The gas diffusion electrode "d" and the gas diffusion electrode "b" of the same size were laid on both sides of a hydrogen ion conductive polymer electrolyte membrane (Nafion 112 manufactured by Du Pont, U.S.A), which is one size larger than these electrodes, in such a manner that the sides provided with the catalyst layers face the hydrogen ion conductive polymer electrolyte membrane. After silicone rubber gaskets with a thickness of 250 ìm were positioned on both sides, hot pressing was applied at 130° C. for 5 minutes to prepare an MEA.

Then, a unit cell was prepared by disposing separator plates on both sides of the MEA, and four unit cells were stacked to obtain a cell stack (the polymer electrolyte fuel cell of the present invention). Used as the separator plates was 4 mm-thick carbon-made plate, which had air-tightness.

On the surface in contact with the gas diffusion electrode were formed gas flow paths of 2 mm in width and 1 mm in depth by cutting process.

On and under the cell stack were disposed and fixed metal end plates made of SUS304. The gas diffusion electrode "d" was disposed in such a manner that the $R_3$ side was on the inlet side and the $L_3$ side was on the outlet side of the gas flow paths in the separator plates.

Next, air was supplied from the inlet side towards the outlet side of the gas flow paths in the separator plates in the gas diffusion electrode "d", whereas hydrogen was supplied from the inlet side towards the outlet side of the gas flow paths in the separator plates in the gas diffusion electrode "b", and the fuel cell was operated under the conditions that the utilization of oxygen was 40%; the utilization of hydrogen was 70%; hydrogen humidifying bubbler temperature was 85° C.; air humidifying bubbler temperature was 65° C.; and cell temperature was 75° C.

As a result, the polymer electrolyte fuel cell operated in a quite stable manner, while maintaining the initial voltage as long as over 3000 hours. The reason for this is that the polymer electrolyte fuel cell of the present example was able to discharge excess water content resulting from the produced water safely and quickly, while keeping the polymer electrolyte in the humidified condition.

EXAMPLE 4

(1) Production of Gas Diffusion Electrode

In the present example, the gas diffusion electrode of Embodiment 4 shown in FIG. 9 was produced. First, 10 g of acetylene black having a mean particle size of 4 ìm (DENKA BLACK manufacture by Denki Kagaku Kogyo K.K.) and 2 g of fluorocarbon resin (D-1 manufactured by Daikin Industries, Ltd.) were mixed and stirred to prepare a dispersion "c" where acetylene black was dispersed in the fluorocarbon resin. Furthermore, 10 g of acetylene black having a mean particle size of 1 ìm and 2 g of fluorocarbon resin (D-1 manufactured by Daikin Industries, Ltd.) were mixed and stirred to prepare a dispersion "d" where acetylene black was dispersed in the fluorocarbon resin.

After the dispersion "c" was screen-printed on the porous material "b" at a fixed pushing pressure, the dispersion "d" was screen-printed on the porous material "b" while changing the pushing pressure from one side to the other side thereof to change the applied amount of the dispersion "d".

The applied porous material "b" was baked at 350° C. to obtain a gas diffusion layer "e". The surface of the gas diffusion layer "e" was observed by an optical microscope to find that a layer containing acetylene black and fluorocarbon resin was formed on the porous material "b" and that, in the layer, the acetylene black having a mean particle size of 4 ìm was present uniformly in the plane of the gas diffusion layer "e"; however, the acetylene black having a mean particle size of 1 ìm decreased from one end ($R_4$ side) towards the other end ($L_4$ side) of the gas diffusion layer "e".

The obtained gas diffusion layer "e" was divided into $R_4$ side and $L_4$ side, and the amount of penetrating water on each side was evaluated. The amount was $0.8 \times 10^4$ g/m²·24 h on the $R_4$ side and $1.8 \times 10^4$ g/m²·24 h on the $L_4$ side. This revealed that the amount of penetrating water decreased on the $R_4$ side and increased on the $L_4$ side.

Next, carbon powder having a particle size not larger than 3 ìm (KETJEN BLACK EC manufactured by AKZO chemie, Holland) was soaked in an aqueous solution of platinum chloride to obtain a catalyst body carrying a platinum catalyst on the surface of the carbon powder through a reduction treatment. In this case, the carbon and the carried platinum were set at a ratio of 1:1 in weight.

Then, the obtained catalyst was dispersed in an alcohol dispersion in which a polymer electrolyte was dispersed to prepare a slurry, and the slurry was applied evenly on a side of the gas diffusion layer "e" to form a catalyst layer, thereby obtaining a gas diffusion electrode "e".

(2) Production of Polymer Electrolyte Fuel Cell

The gas diffusion electrode "e" and the gas diffusion electrode "b" of the same size were laid on both sides of a hydrogen ion conductive polymer electrolyte membrane (Nafion 112 manufactured by Du Pont, U.S.A), which is one size larger than these electrodes, in such a manner that the sides provided with the catalyst layers face the hydrogen ion conductive polymer electrolyte membrane. After silicone rubber gaskets with a thickness of 250 ìm were positioned on both sides, hot pressing was applied at 130° C. for 5 minutes to prepare an MEA.

Then, a unit cell was prepared by disposing separator plates on both sides of the MEA, and four unit cells were stacked to obtain a cell stack (the polymer electrolyte fuel cell of the present invention). Used as the separator plate was 4 mm-thick carbon-made plate, which had air-tightness. On the surface in contact with the gas diffusion layer were formed gas flow paths of 2 mm in width and 1 mm in depth by cutting process.

On and under the cell stack were disposed and fixed metal end plates made of SUS304. The gas diffusion electrode "e" was disposed in such a manner that the $R_4$ side was on the inlet side and the $L_4$ side was on the outlet side of the gas flow paths in the separator plates.

Next, air was supplied from the inlet side towards the outlet side of the gas flow paths in the separator plates in the gas diffusion electrode "e", whereas hydrogen was supplied from the inlet side towards the outlet side of the gas flow paths in the separator plates in the gas diffusion electrode "b", and the fuel cell was operated under the conditions that the utilization of oxygen was 40%; the utilization of hydrogen was 70%; hydrogen humidifying bubbler temperature was 85° C.; air humidifying bubbler temperature was 65° C.; and cell temperature was 75° C.

As a result, the polymer electrolyte fuel cell operated in a quite stable manner, maintaining the initial voltage as long as over 3000 hours. The reason for this is that the polymer electrolyte fuel cell of the present example was able to discharge excess moisture content resulting from the produced water safely and quickly, while keeping the polymer electrolyte in the humidified condition.

Comparative Example

A polymer electrolyte fuel cell was produced by the same operations as in the above embodiments except that two gas diffusion electrodes "b" were used for the gas diffusion electrodes. The polymer electrolyte fuel cell thus completed was operated under the same conditions as in the examples to find that the operation was unstable while decreasing the voltage at the rate of about 1 mv/1 h.

The reason for this was that in this polymer electrolyte fuel cell, the water content of the MEA was controlled insufficiently and caused gas diffusion failure due to the drying process of the hydrogen ion conductive polymer electrolyte membrane on the inlet side, or due to the flooding on the outlet side.

EXAMPLE 5

First, a 5 wt % solution of Nafion (manufactured by Aldrich, U.S.A.) and water were mixed in a predetermined ratio into platinum-carried carbon powder (50 wt % platinum) to prepare a catalyst layer ink. The catalyst layer ink was divided into five portions and formed into five kinds of catalyst layer inks A, B, C, D, and E containing platinum-carried carbon powder having median diameters of 0.05 ìm, 0.1 ìm, 5 ìm, 10 ìm and 20 ìm, respectively, by using a bead mill disperser (Dispermat SL-C12Z manufactured by GETZMANN, Germany).

Figure 14:
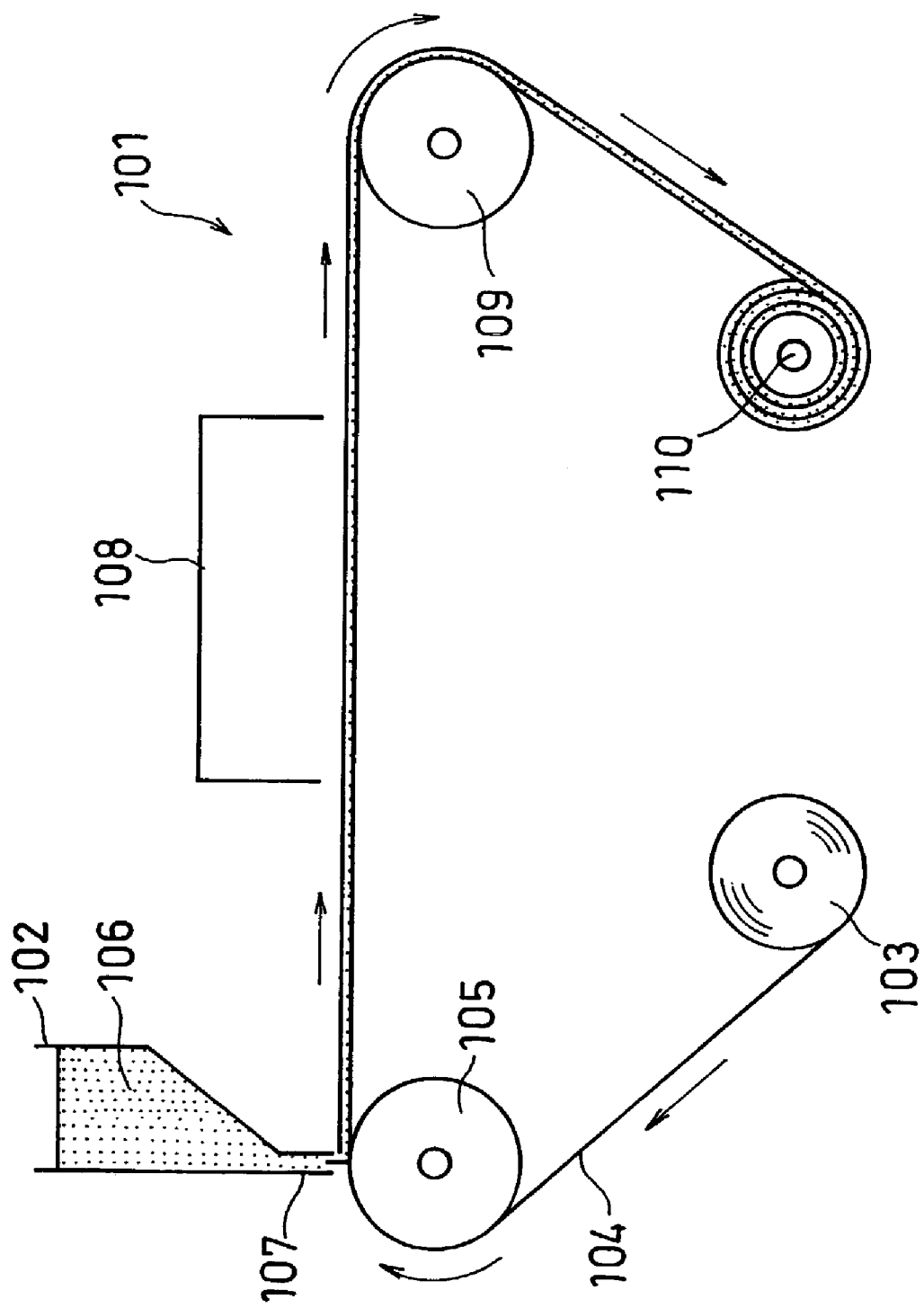
FIG. 14 is a view showing the structure of the application device used in the present invention.

These kinds of inks were applied on a base material 104 using an application device 101 shown in FIG. 14. Used as the base material 104 was a film (thickness: 50 ìm, width: 250 mm) of polyethylene terephthalate (PET). First, a catalyst layer ink 106 was put in a tank 102, and the PET film was fed from the unwinding unit 103 of the application device 101 to a first support roll unit 105 for performing application. The catalyst layer ink 106 was applied on the film through a slit-like nozzle 107 from the tank 102. The gap between the nozzle and the film was set at 50 to 250 ìm, and the feeding speed was set at 1 m/min. The PET film on which the catalyst layer was applied was transferred to a drying room 108 set at a temperature of 60°C.; thereby forming the catalyst layer on the film. The film was wound up in a winding unit 110 through a second support roll unit 109.

Then, in-plane porosities of the catalyst layer A formed using the catalyst layer ink A, the catalyst layer B formed using the catalyst layer ink B, the catalyst layer C formed using the catalyst layer ink C, the catalyst layer D formed using the catalyst layer ink D, and the catalyst layer E formed using the catalyst layer ink E were measured. The porosities were determined by performing an image processing (binary processing, measuring range of about 30 mm$^2$, Image Analyzer V10: Toyobo Co. Ltd.). Table 1 shows the porosities of the catalyst layers A–E.

TABLE 1

|  | Median diameter (ìm) | Porosity (%) |
|---|---|---|
| Catalyst layer A | 0.05 | 0.05 |
| Catalyst layer B | 0.1 | 1.5 |
| Catalyst layer C | 5 | 4 |
| Catalyst layer D | 10 | 15 |
| Catalyst layer E | 20 | 18 |

A polymer electrolyte membrane (Nafion 112 manufactured by Du Pont) was sandwiched between two of each catalyst layer A–E using hot pressing to obtain the composites A–E. These composites were sandwiched by carbonpaper (TGP-H-120 manufactured by Toray Industries, Inc.) via gaskets to produce unit cells (the fuel cells of the present invention) A–E containing the electrolyte membrane-electrode assemblies A–E. They were set in a unit cell test device to check characteristics of each cell. In the produced unit cells, the fuel electrode was supplied with an imitated reformed gas (carbon dioxide 25%, carbon monoxide 50 ppm, hydrogen balance gas) whereas the air electrode was supplied with air, and the fuel cell was operated under the conditions that cell temperature was 80° C., the utilization of fuel was 80%, and the unitization factor of air was 40%, the imitated reformed gas was humidified to have a dew point of 75° C., and the air was humidified to have a dew point of 60° C.

Figure 15:
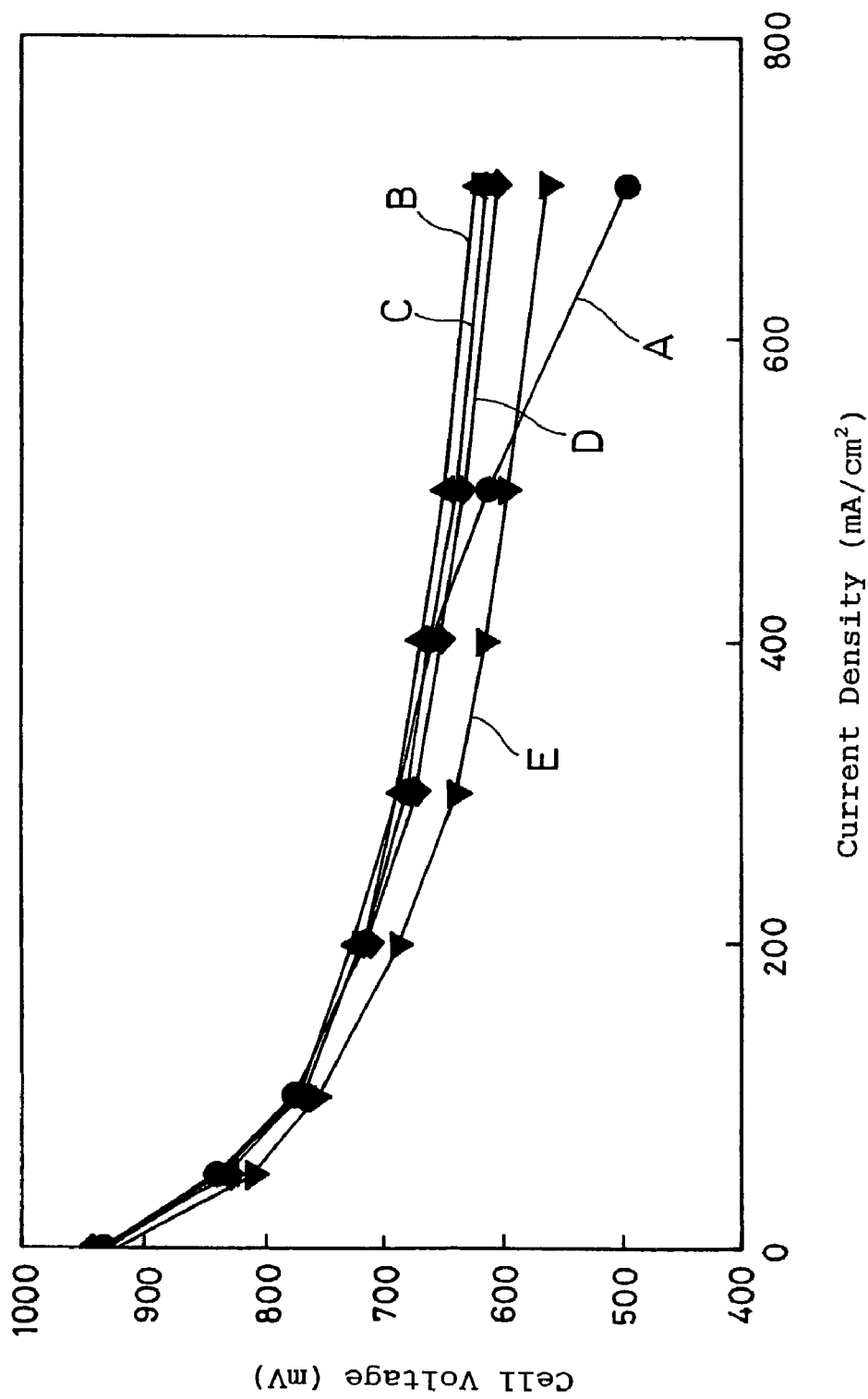
FIG. 15 is a view showing characteristics of the fuel cell of Example 5 of the present invention.

FIG. 15 shows the current-voltage characteristic of each cell. This has revealed that the performance of the unit cell A using the catalyst layer A having the lowest porosity lowers in the high current density region than the other cells. It has also been found that the performance of the unit cell E using the catalyst layer E having the highest porosity has lowers as a whole.

Figure 16:
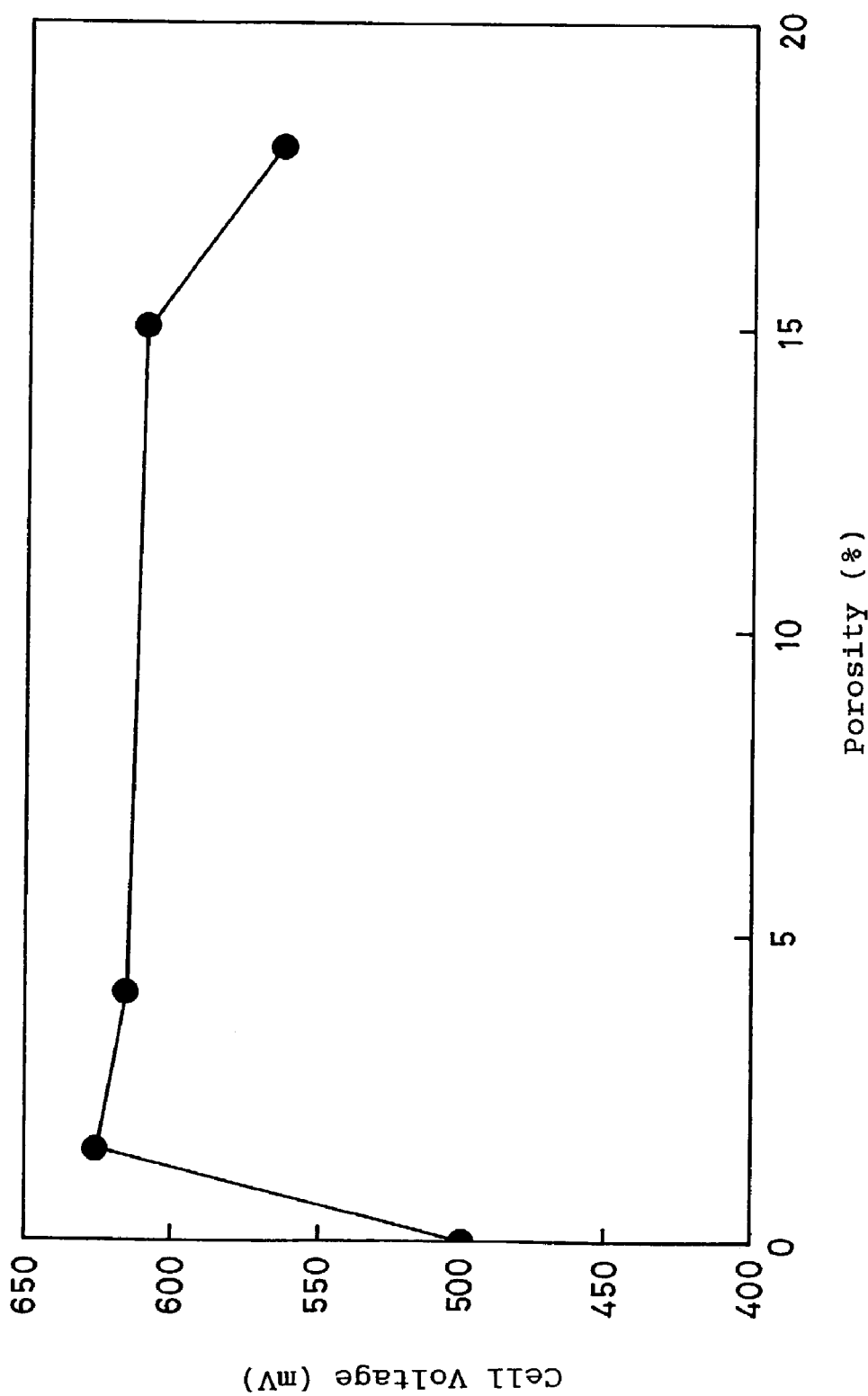
FIG. 16 is a view showing characteristics of the fuel cell of Example 5 of the present invention.

The relation between the cell voltage of each cell at the current density of 0.7 A/cm$^2$ in FIG. 15 and the porosity of the catalyst layer used in each cell is shown in FIG. 16. This has revealed that the cell performance decreases when the in-plane porosity of the catalyst layer is too low or too high. It has also been found that a high-performing cell can be provided when the in-plane porosity of the catalyst layer is about 0.1 to 15%.

While using the catalyst layer ink C, the catalyst layers C1, C2, and C3 were formed in the same manner as above by setting the drying temperature at 40° C., 60° C., and 80° C., respectively, and their porosities were measured. As a result, it has turned out that the porosity, which was 4% at 60° C. becomes 2% in C1 obtained with the drying temperature of 40° C., and becomes 6% in C3 obtained with the drying temperature of 80° C. The performance of the unit cells produced by using these catalyst layers was examined and found that they had the same performance as the unit cell C.

From the aforementioned results, it is considered that in a catalyst layer having a small porosity, the cell characteristics decrease because the produced water remains inside the catalyst layer when the cell is operated at a high current density, thereby preventing the diffusion of the reaction gas. In the catalyst layer having a high porosity, it is considered that the catalyst layer gets thicker as a whole, and the catalyst becomes insufficient in the vicinity of the polymer electrolyte, thereby decreasing the reaction area.

Regarding the catalyst layers having intermediate porosities, it is considered that their moderate porosities (0.1 to 15%) prevent the amount of catalyst from becoming insufficient in the vicinity of the polymer electrolyte, and that the water produced by the cell reaction is quickly discharged from these pores to the carbon paper as the gas diffusion layer, without preventing the diffusion of the reaction gas, thereby exhibiting high cell performances.

Adopting this method enables the provision of a high-performing cell by changing the median diameter of the catalyst layer ink and controlling the in-plane porosity of the catalyst layer, without decreasing the utilization of the catalyst. The porosity can be also changed by controlling the drying temperature. It is also possible to design a fuel cell according to the purpose by controlling the porosity.

In the present embodiment, a PET film is used as the base material; however, a polypropylene (PP) film can be used instead. The base material can be other than these. It is also possible to form the film by applying a catalyst layer ink directly onto the carbon paper which is to be the gas diffusion layer. The composition of the catalyst layer ink, the composition of the electrode ink, and the drying conditions are not limited to those in the above examples, and can be selected within the range not losing the effects of the present invention.

EXAMPLE 6

The design of the drying room belonging to the application device 101 used in Example 5 was changed and the room was divided into two stages of the former stage and the latter stage, and the drying temperatures of the first drying room and the second drying room were made to be controlled independently from each other.

Then, application was carried out in the same manner as in Example 5 by using the catalyst layer ink B used in Example 5 and the application device 101 whose design has been modified. At this time, the drying conditions were changed to produce catalyst layers B1–B4, and the porosities in the planes of the catalyst layers were measured in the same manner as in Example 5. The relation between the drying temperature and the porosity in the catalyst layer plane is shown in Table 2.

TABLE 2

|  | Drying temperature (° C.) | | Porosity (%) |
|---|---|---|---|
|  | First drying room | Second drying room |  |
| Catalyst layer B1 | 40 | 80 | 0.06 |
| Catalyst layer B2 | 60 | 80 | 2.0 |
| Catalyst layer B3 | 80 | 80 | 7.5 |
| Catalyst layer B4 | 95 | 80 | 16 |

From the table, it has turned out that the in-plane porosity of the catalyst layer can be controlled by controlling the drying temperature even when the same catalyst layer ink is used. The reason for this is considered that varying the drying conditions change the agglomeration state of the polymer electrolyte and the catalyst-carried carbon particles in the catalyst layer, thereby changing the crack-like cavities in the plane of the catalyst layer.

Figure 17:
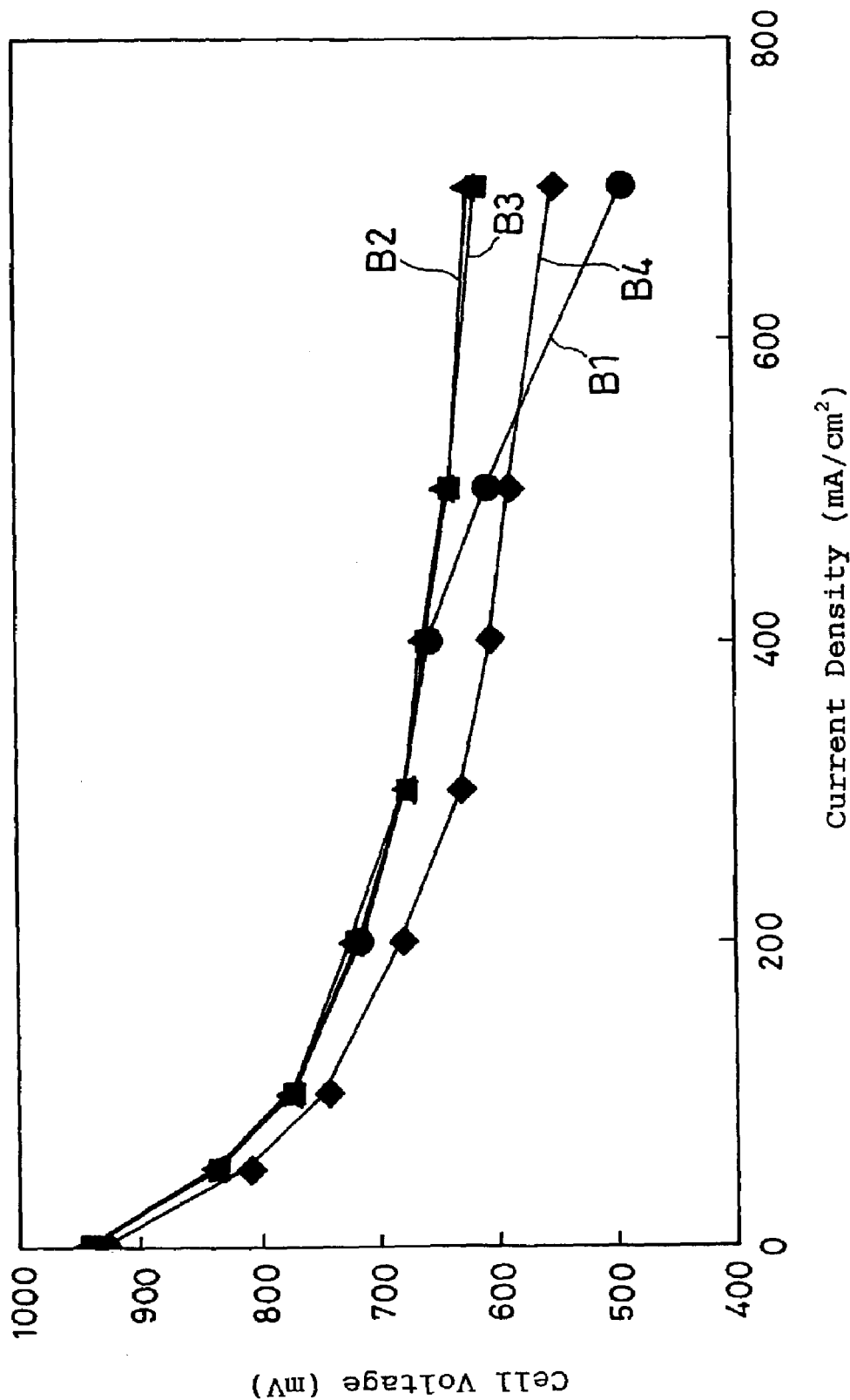
FIG. 17 is a view showing characteristics of the fuel cell of Example 6 of the present invention.

Unit cells B1–B4 were produced in the same manner as in Example 5 by using these catalyst layers B1–B4, and their cell performances were examined. The test conditions of the cells were the same as in Example 5. The current-voltage properties of these unit cells are shown in FIG. 17.

This indicates that the unit cell B1 using the catalyst layer B1 having a small porosity in the plate decreases the properties in the high current density region. Although the catalyst layer B1 has the advantage of having a low porosity because the drying temperature is low in the former stage, when the cell is operated at high current density, the produced water remains in the catalyst layer and prevents the diffusion of the reaction gas, which leads to a decrease in cell performance.

In contrast thereto, in the case of the catalyst layer B4, the drying temperature is higher in the former stage than in the latter stage, which causes a sudden solvent volatilization in the former stage, thereby increasing the porosity in the plane of the catalyst layer. Although this increases the porosity, the catalyst layer gets thicker as a whole, making the catalyst insufficient in the vicinity of the polymer electrolyte, thereby reducing the reaction area. This seems to be the cause of the decrease in the cell performance.

Regarding the catalyst layers B2 and B3 having intermediate porosities, the drying temperature is set lower in the former stage than in the latter stage so as to obtain a catalyst layer having appropriate porosity, and it is considered that the water produced by the cell reaction is quickly discharged from the pores to the carbon paper as the gas diffusion layer, without preventing the diffusion of the reaction gas, thereby exhibiting high cell performance.

Employing the method of the present invention can achieve a catalyst layer having appropriate porosity by controlling the drying temperature after the application of the catalyst layer ink. This can provide a higher-performing cell than conventional cells.

INDUSTRIAL APPLICABILITY

As described hereinbefore, in the gas diffusion layer using a porous material, making the area of the pores in the porous material larger from one end towards the other end in the gas diffusion layer can adjust the function of penetrating water in the plane of the gas diffusion layer and can quickly discharge surplus water content resulting from the produced water, while keeping the polymer electrolyte in the humidified condition in the MEA. The constitution of a gas diffusion electrode with this gas diffusion layer and the production of a polymer electrolyte fuel cell can achieve a polymer electrolyte fuel cell capable of stable operation over a long period of time.

What is claimed is:

1. A gas diffusion electrode comprising a catalyst layer and a gas diffusion layer containing a porous material, capable of retaining water content homogeneously in a plane of the gas diffusion layer;
   wherein a conductive polymer layer containing two kinds of conductive particles different in particle size and a polymer material is disposed between said gas diffusion layer and said catalyst layer, and
   the content of the conductive particles smaller in particle size decreases from one end towards the other end of said gas diffusion electrode.

2. The gas diffusion electrode in accordance with claim 1, wherein the area of pores in said gas diffusion layer increases from one end towards the other end of said gas diffusion electrode in the plane of said gas diffusion layer that is on said catalyst layer side.

3. The gas diffusion electrode in accordance with claim 1, wherein a polymer material containing conductive particles is included in the pores of said gas diffusion layer, and
   the amount of said polymer material included in said pores decreases from one end towards the other end of said gas diffusion electrode.

4. The gas diffusion electrode in accordance with claim 1, wherein
   the thickness of the conductive polymer layer decreases from one end towards the other end of said gas diffusion electrode.

5. A method for producing a gas diffusion electrode comprising the steps of:
   providing a layer of porous material for forming a gas diffusion layer;
   mixing carbon materials different in mean particle size and a solvent to prepare a first solution and a second solution;
   applying said first solution from one end towards the other end of said layer of porous material;
   applying said second solution on said layer of porous material, on which said first solution has been applied, in such a manner that the amount of said second solution changes from one end towards the other end of said layer of porous material; and heat-processing said layer of porous material with said solutions applied to obtain the gas diffusion layer.

6. A polymer electrolyte fuel cell comprising a plurality of unit cells stacked, each unit cell comprising:

a hydrogen ion conductive polymer electrolyte membrane;

a first gas diffusion electrode and a second diffusion electrode, each comprising a catalyst layer and a gas diffusion layer containing a porous material, which sandwich said hydrogen ion conductive polymer electrolyte membrane in such a manner that said catalyst layer faces said hydrogen ion conductive polymer electrolyte membrane; and a first separator plate having a gas flow path for supplying and distributing an oxidant gas to said first gas diffusion electrode and a second separator plate having a gas flow path for supplying and distributing a fuel gas to said second gas diffusion electrode, wherein said first gas diffusion electrode is composed of the gas diffusion electrode in accordance with claim 1, and said one end of said first gas diffusion electrode is positioned on the inlet side and said other end is positioned on the outlet side of said gas flow path of said first separator.

7. A gas diffusion electrode comprising a catalyst layer and a gas diffusion layer containing a porous material, capable of retaining water content homogeneously in a plane of the gas diffusion layer;

wherein a conductive polymer layer containing at least conductive particles and a polymer material is disposed between said gas diffusion layer and said catalyst layer, and the thickness of the conductive polymer layer decreases from one end towards the other end of said gas diffusion electrode.

8. The gas diffusion electrode in accordance with claim 7, wherein the area of pores in said gas diffusion layer increases from one end towards the other end of said gas diffusion electrode in the plane of said gas diffusion layer that is on said catalyst layer side.

9. The gas diffusion electrode in accordance with claim 7, wherein a polymer material containing conductive particles is included in the pores of said gas diffusion layer, and the amount of said polymer material included in said pores decreases from one end towards the other end of said gas diffusion electrode.

10. A polymer electrolyte fuel cell comprising a plurality of unit cells stacked, each unit cell comprising:

a hydrogen ion conductive polymer electrolyte membrane;

a first gas diffusion electrode and a second diffusion electrode, each comprising a catalyst layer and a gas diffusion layer containing a porous material, which sandwich said hydrogen ion conductive polymer electrolyte membrane in such a manner that said catalyst layer faces said hydrogen ion conductive polymer electrolyte membrane; and a first separator plate having a gas flow path for supplying and distributing an oxidant gas to said first gas diffusion electrode and a second separator plate having a gas flow path for supplying and distributing a fuel gas to said second gas diffusion electrode, wherein said first gas diffusion electrode is composed of the gas diffusion electrode in accordance with claim 7, and said one end of said first gas diffusion electrode is positioned on the inlet side and said other end is positioned on the outlet side of said gas flow path of said first separator.

* * * * *